Feb. 19, 1952     S. HINDS     2,586,332
COMPUTING INDEXING MECHANISM
Filed Feb. 27, 1947     14 Sheets-Sheet 1
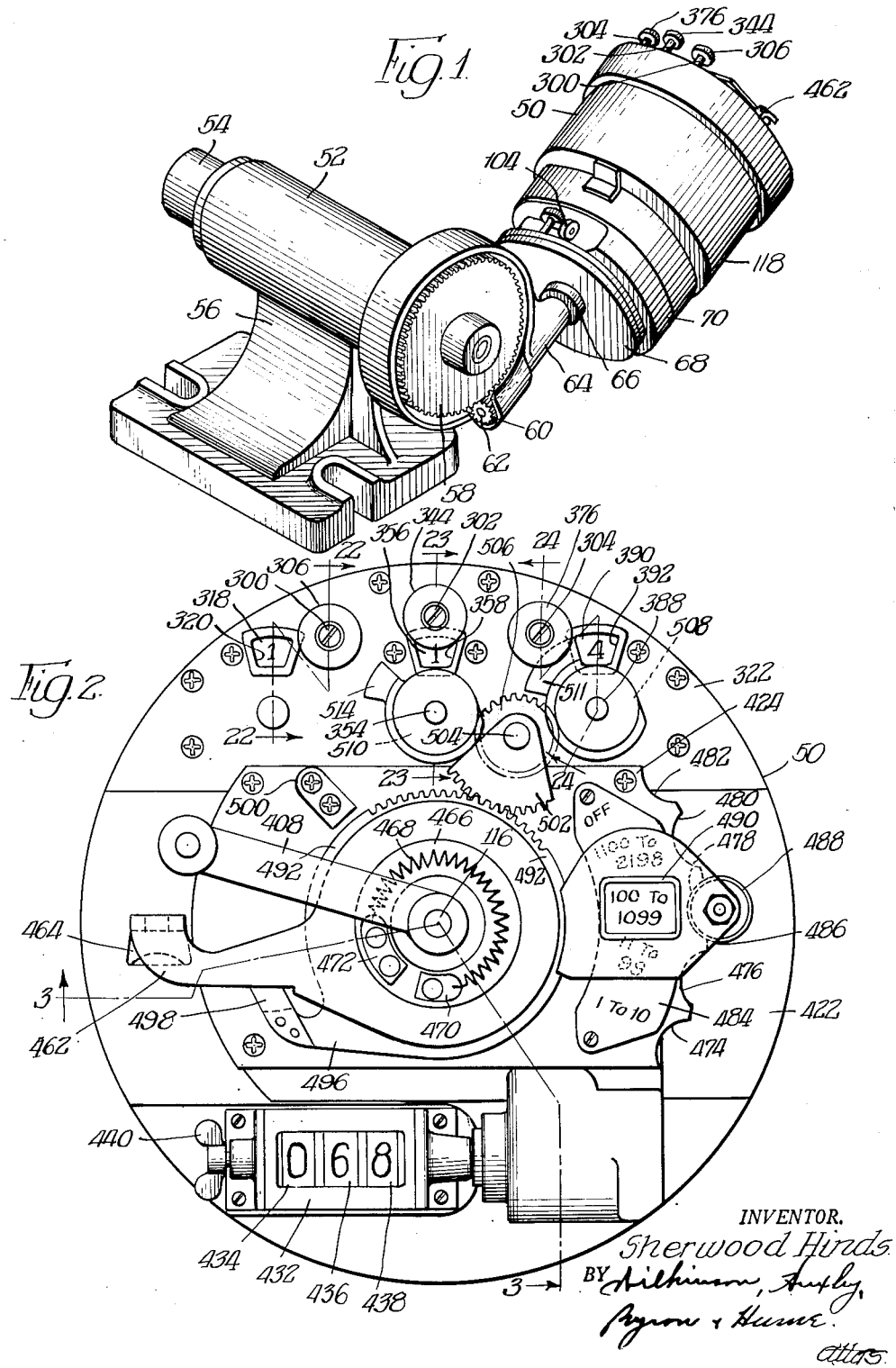
INVENTOR.
Sherwood Hinds

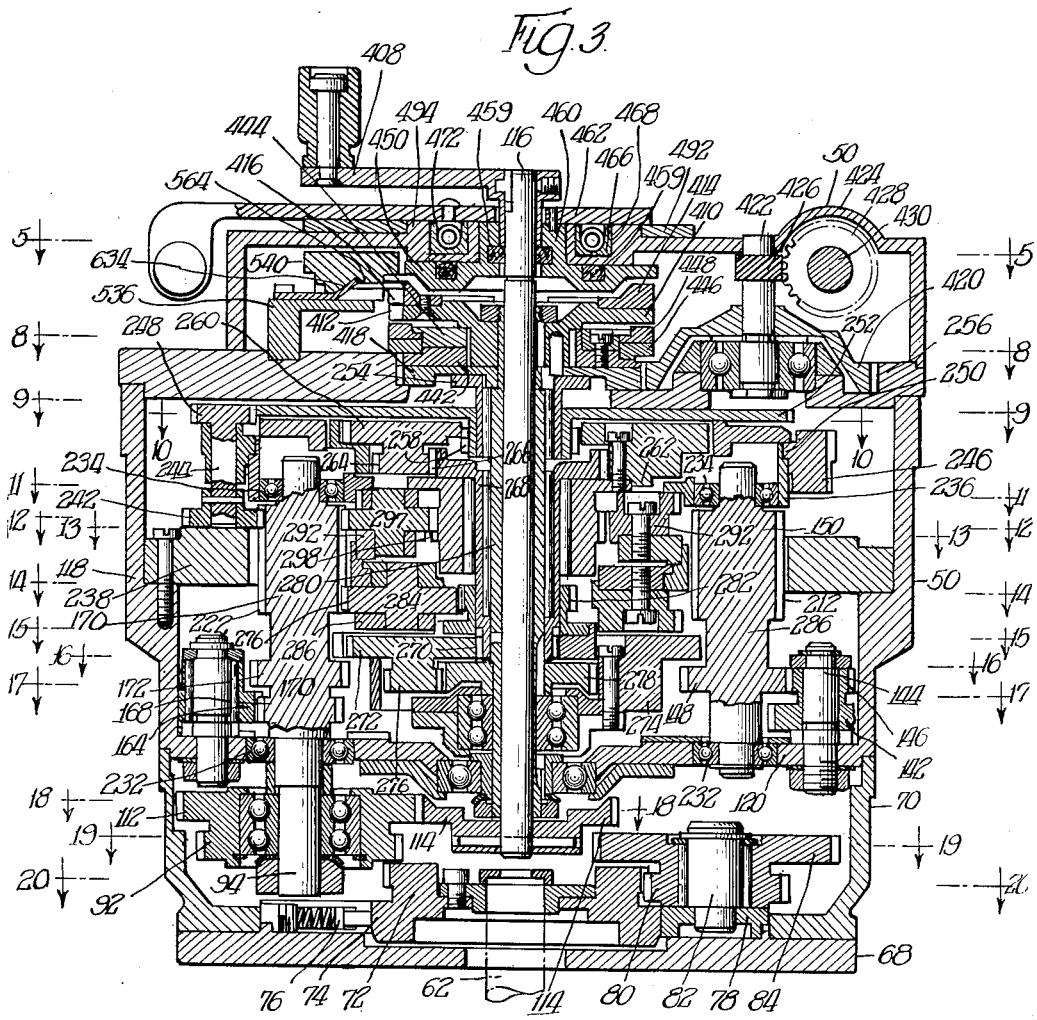

Feb. 19, 1952 S. HINDS 2,586,332
COMPUTING INDEXING MECHANISM
Filed Feb. 27, 1947 14 Sheets-Sheet 3
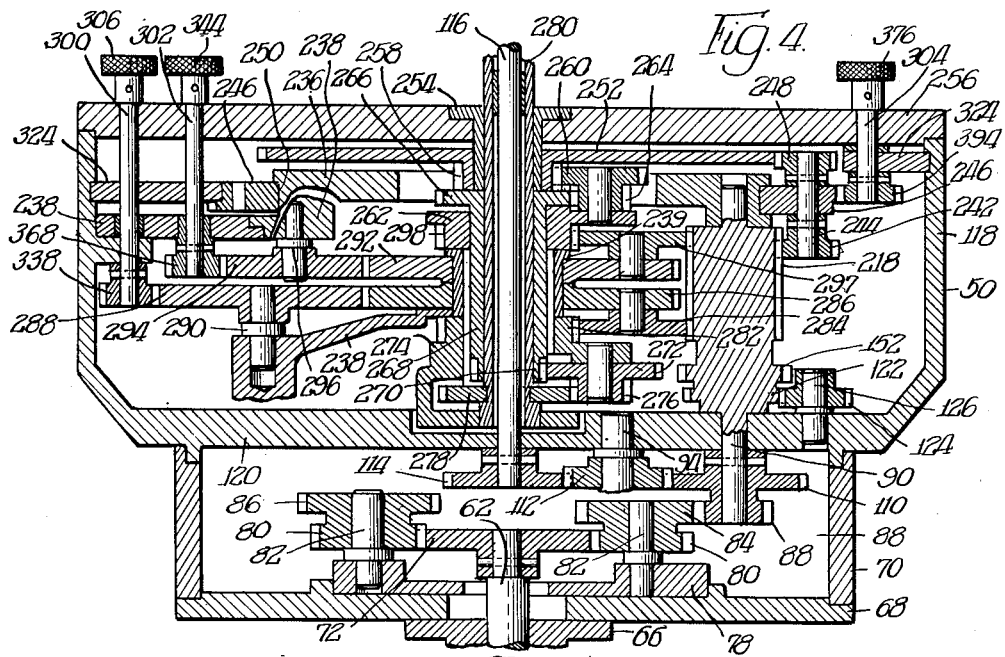
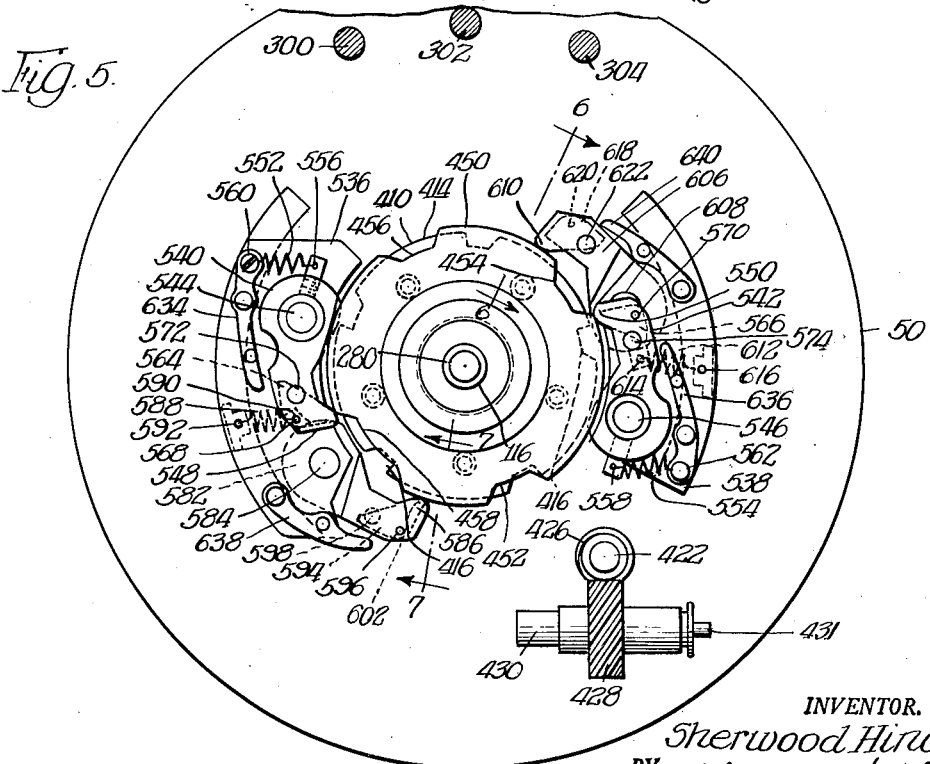
INVENTOR.
Sherwood Hinds,
BY
ATTYS.

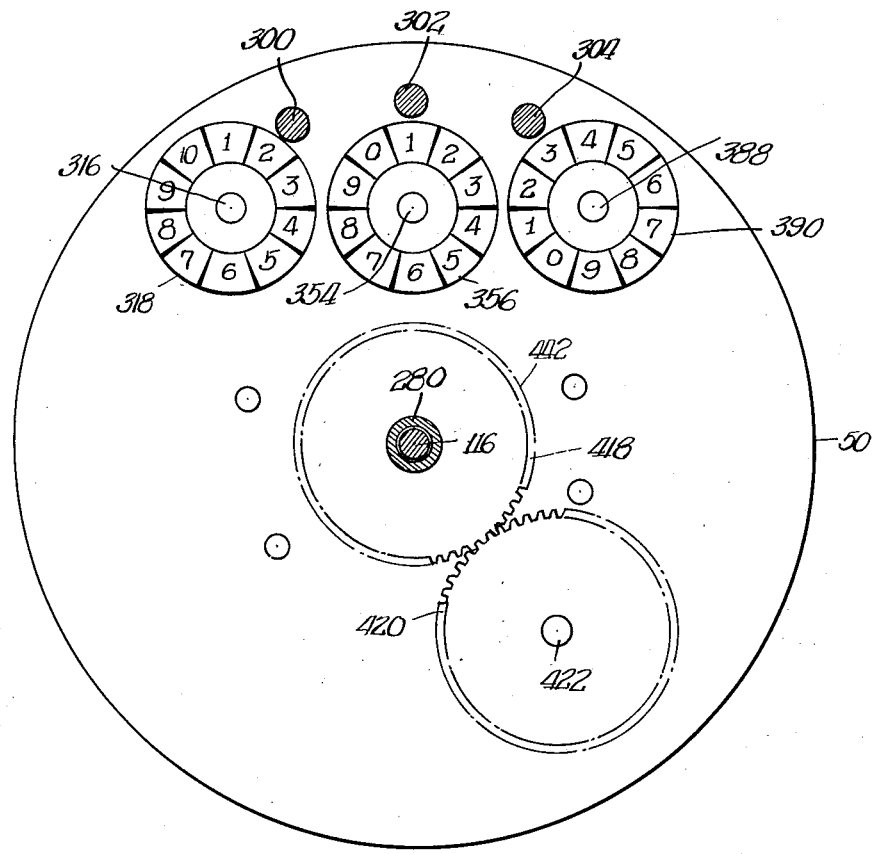

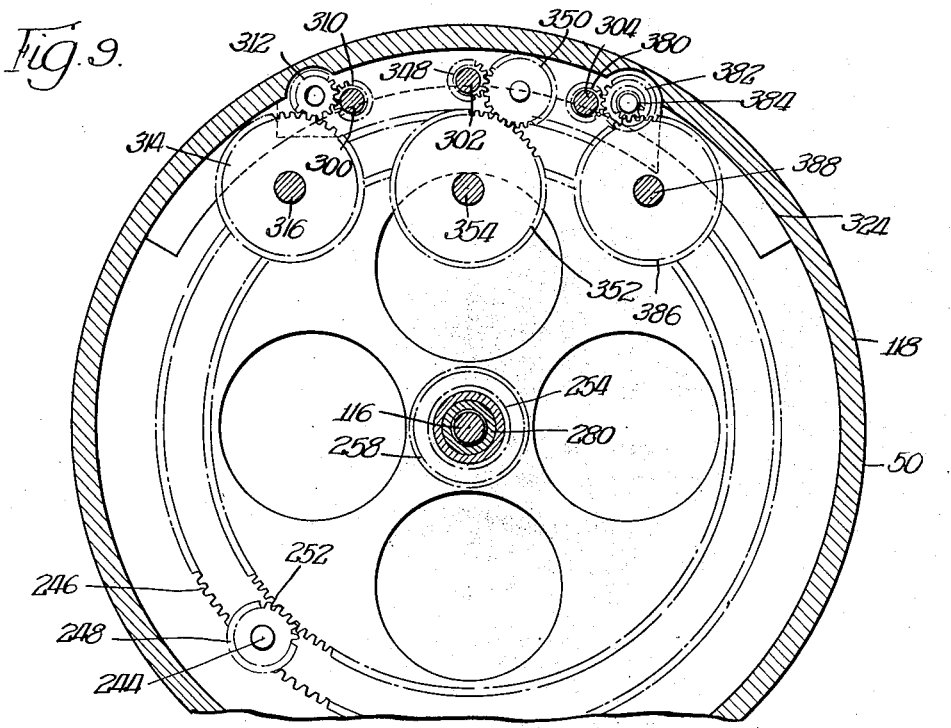
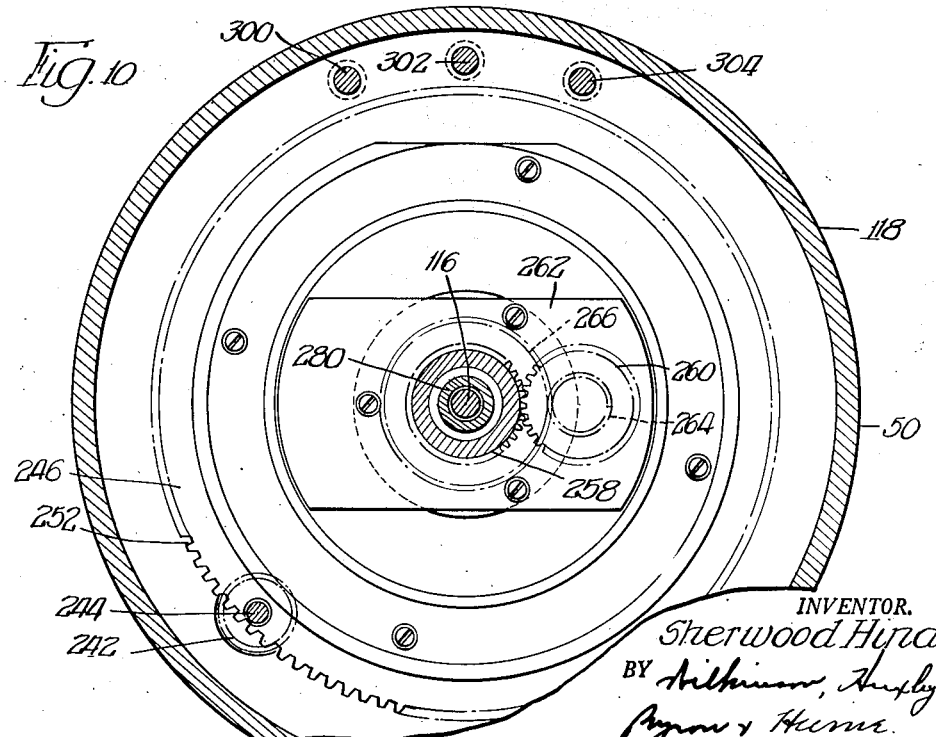

Feb. 19, 1952

S. HINDS 2,586,332

COMPUTING INDEXING MECHANISM

Filed Feb. 27, 1947

INVENTOR.
Sherwood Hinds,
BY
Attys.

Feb. 19, 1952   S. HINDS   2,586,332
COMPUTING INDEXING MECHANISM
Filed Feb. 27, 1947   14 Sheets-Sheet 7
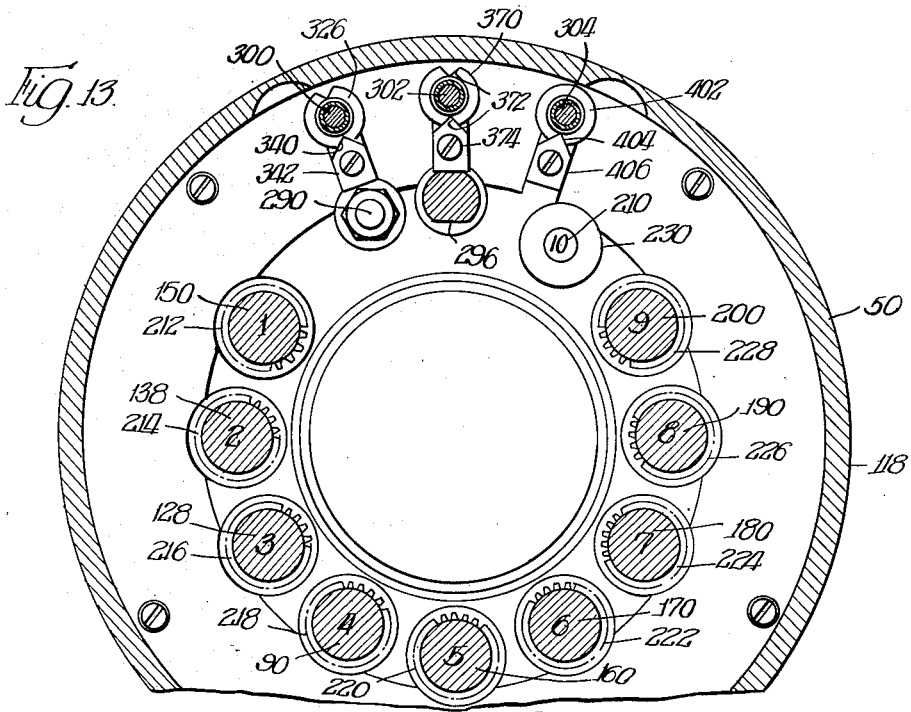
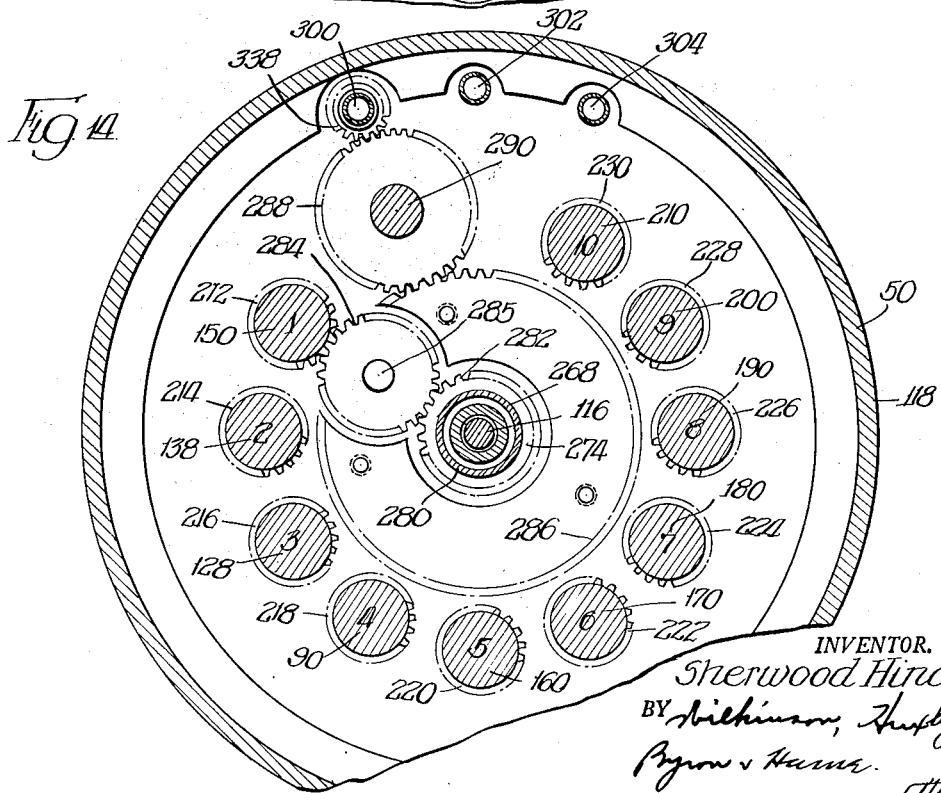
INVENTOR.
Sherwood Hinds, Feb. 19, 1952 — S. HINDS — 2,586,332

COMPUTING INDEXING MECHANISM

Filed Feb. 27, 1947 — 14 Sheets-Sheet 8

INVENTOR.
Sherwood Hinds,
BY *Atkinson, Huxley, Byron & Hume.*
ATTYS.

INVENTOR.
Sherwood Hinds,
BY

Feb. 19, 1952 S. HINDS 2,586,332
COMPUTING INDEXING MECHANISM
Filed Feb. 27, 1947 14 Sheets-Sheet 10
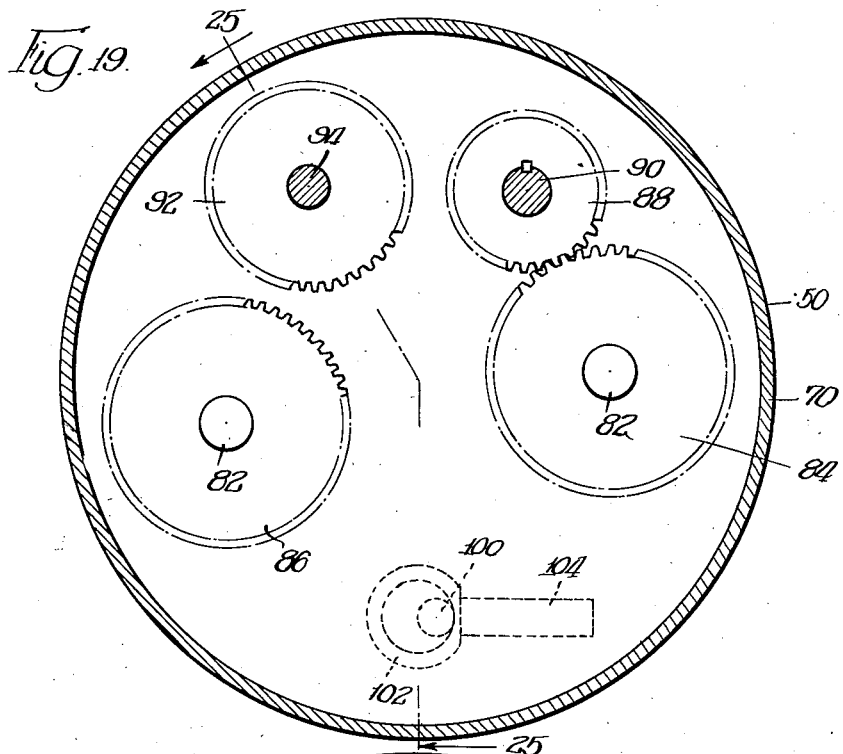
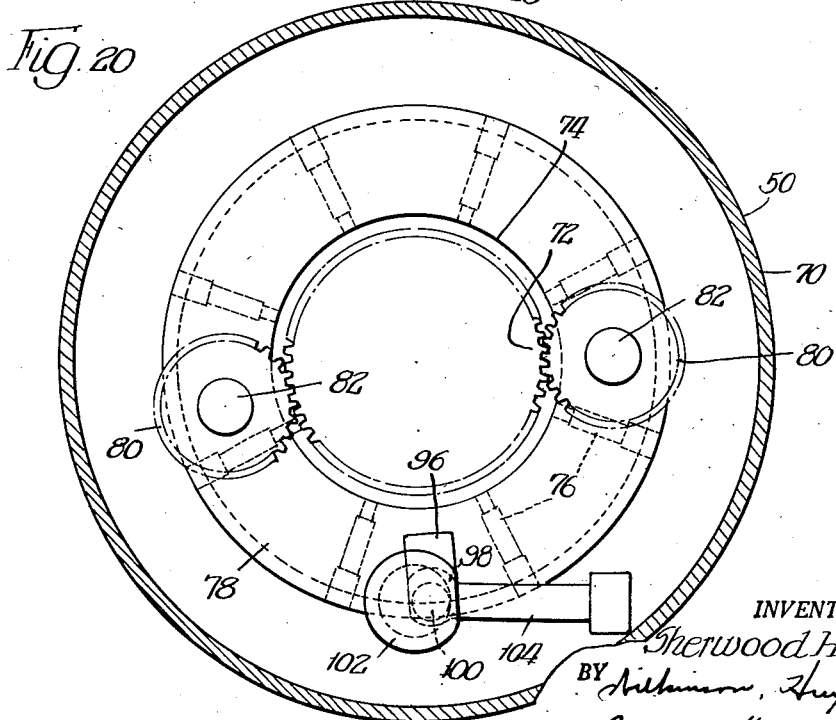
INVENTOR.
Sherwood Hinds,
BY Feb. 19, 1952  S. HINDS  2,586,332
COMPUTING INDEXING MECHANISM
Filed Feb. 27, 1947  14 Sheets-Sheet 11
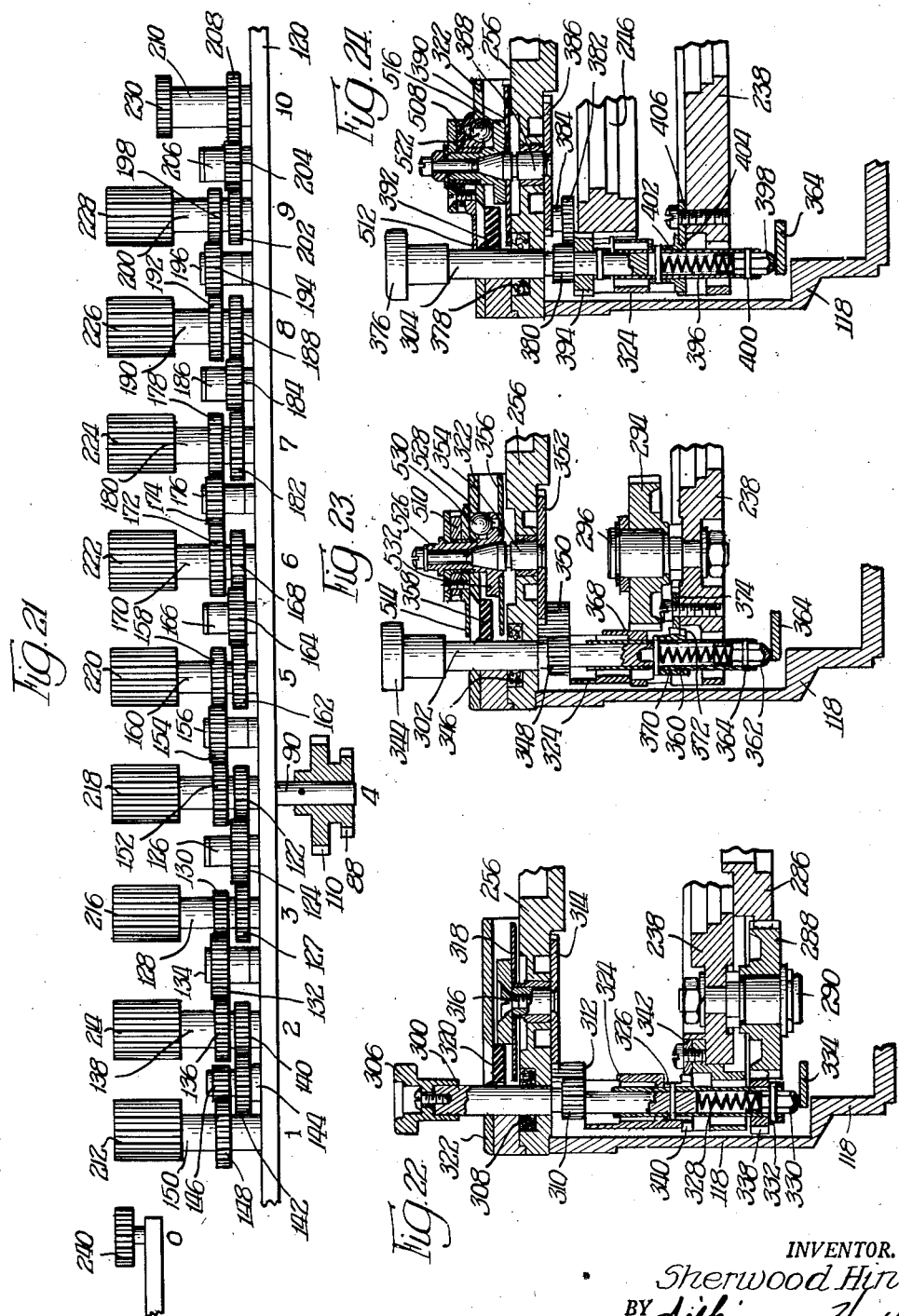
INVENTOR.
Sherwood Hinds
BY
ATTYS.

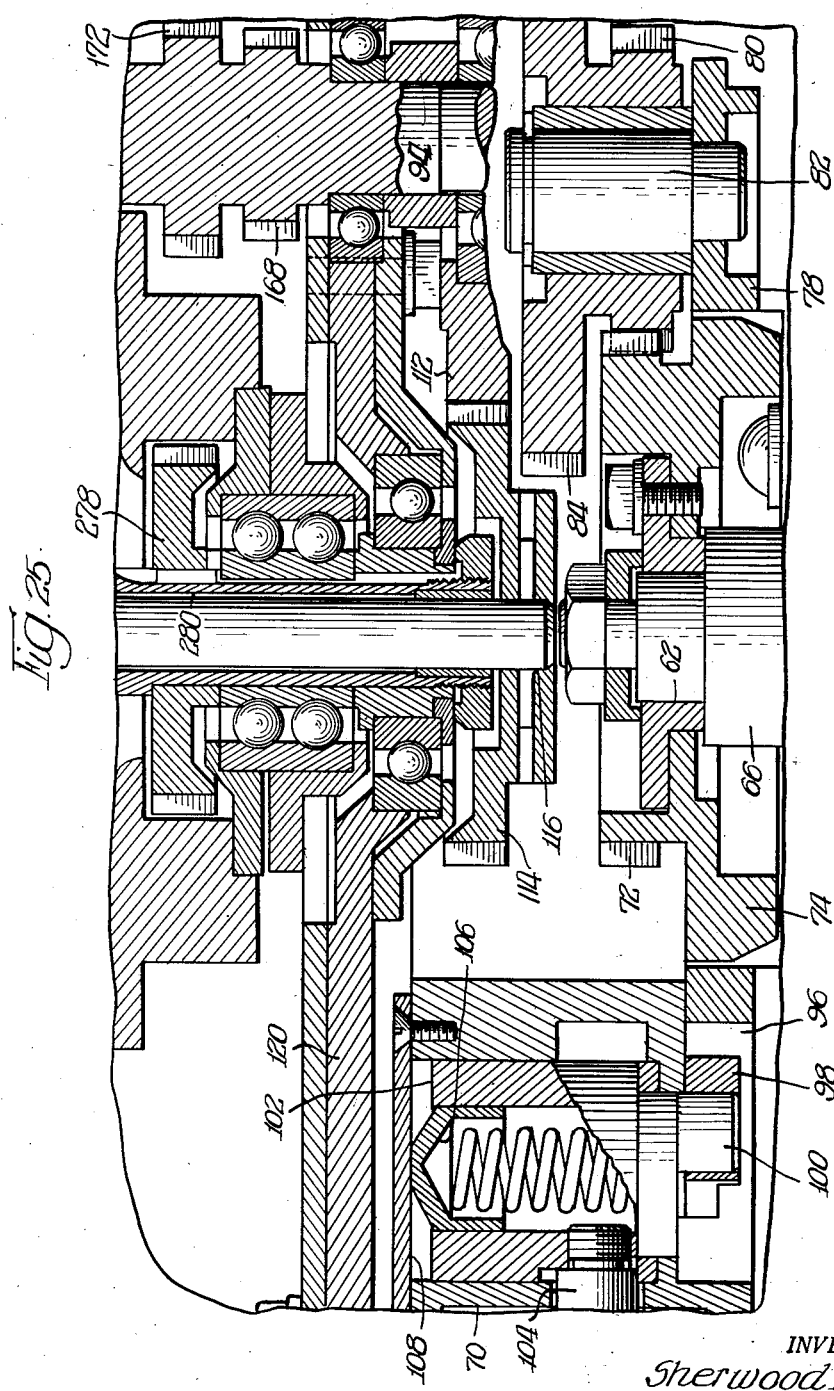

Feb. 19, 1952 S. HINDS 2,586,332
COMPUTING INDEXING MECHANISM
Filed Feb. 27, 1947 14 Sheets-Sheet 13
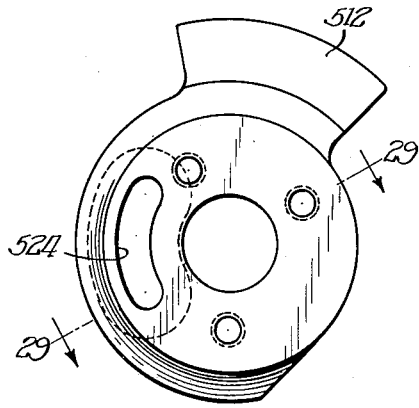
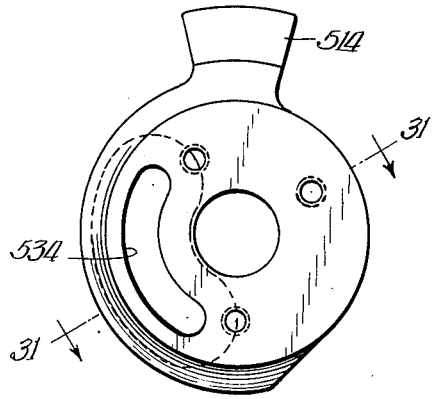
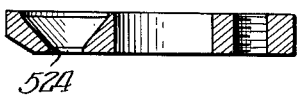
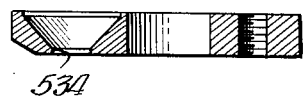
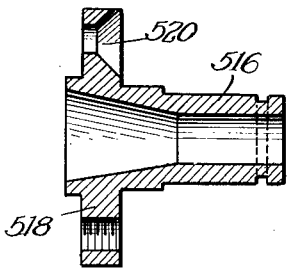
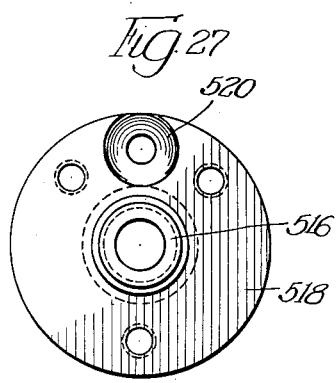
INVENTOR.
Sherwood Hinds,
BY
Attys.

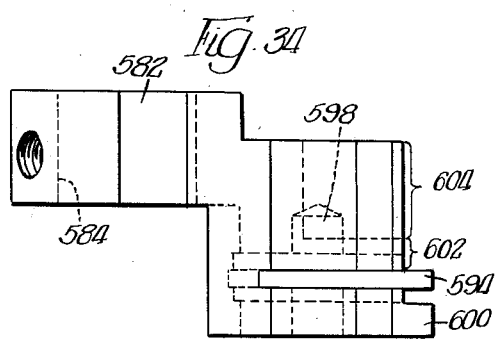
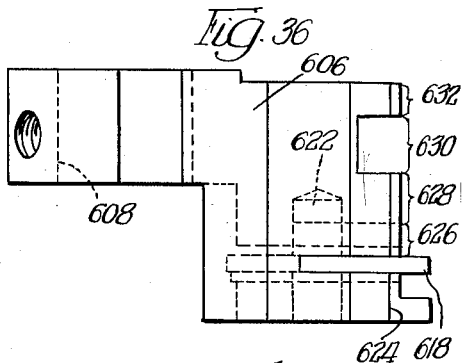
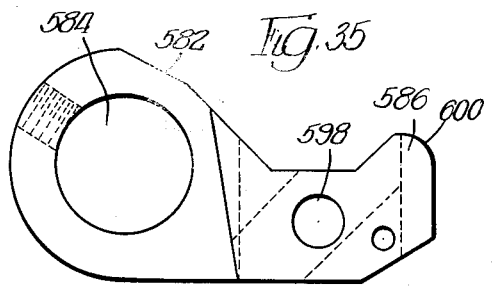
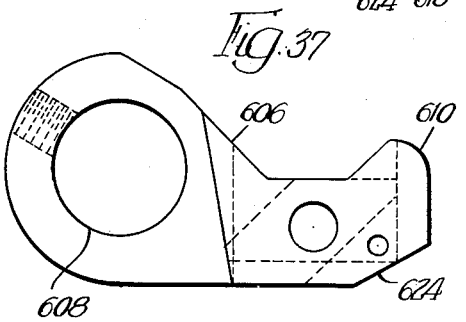
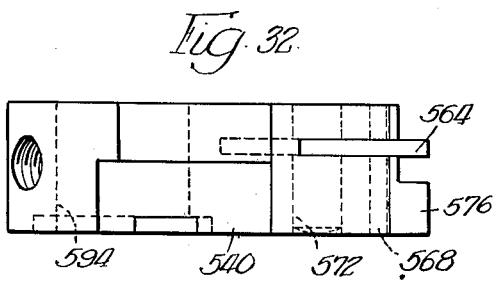
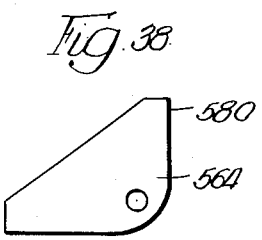
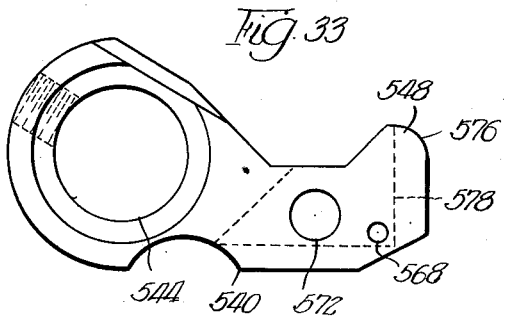
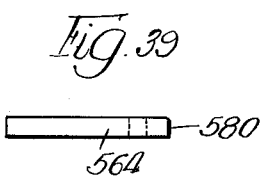

Patented Feb. 19, 1952

2,586,332

UNITED STATES PATENT OFFICE 2,586,332

COMPUTING INDEXING MECHANISM

Sherwood Hinds, Columbia City, Ind., assignor of one-half to Robert J. Jauch, Fort Wayne, Ind.

Application February 27, 1947, Serial No. 731,315

12 Claims. (Cl. 90—57)

This invention pertains to computing indexing mechanism, such as a dividing head, circular table, and the like.

It is an object of this invention to provide computing indexing mechanism to readily divide a circle into substantially any chosen number of parts.

Another object of this invention is to provide a method whereby polar coordinates in layout work, as in machine shops, may be used in preference to the method of linear coordinates.

Another object of this invention is to provide computing indexing mechanism which is readable at any time to shown the condition of work being done.

Another object of this invention is to provide computing indexing mechanism wherein a positive stop is provided at the selected position of a complete operation.

Another object of this invention is to provide computing indexing mechanism wherein, in gear cutting the condition of the gear being cut can be read on the device at any time.

Another object of this invention is to provide computing indexing mechanism which will divide a circle into equal parts for every number as for example between 1 and 1099, or every even number between 1000 and 2198, etc.

Another object of this invention is to provide computing indexing mechanism wherein setting for any particular "number" of divisions desired is made by simply "setting up" that number on a dial or dials.

Another object of the invention is to provide computing indexing mechanism wherein while the device is being operated, the number of divisions for which the unit has been set to divide, as well as the number of divisions that have already been indexed, remain in constant view of the operator.

Another object of the invention is to provide computing indexing mechanism wherein no "hole plates," "followers," or other loose pieces to get lost or misplaced, are used.

Another object of the invention is to provide computing indexing mechanism wherein no wrenches, screw drivers or other tools of any kind are required when making a setting.

Another object of the invention is to provide computing indexing mechanism wherein setting can be made for any "number" desired in not over two minutes' time by any operator capable of operating the machine to which the dividing head or circular table is attached.

Another object of the invention is to provide computing indexing mechanism wherein it is no longer necessary to waste time "knicking" the work piece after setting up and before going ahead with the work on the piece, to insure that the set up is correct.

Another object of the invention is to provide computing indexing mechanism wherein no "gear charts" or "hole log sheets," that confuse all but the most capable operators, are used.

Another object of the invention is to provide computing indexing mechanism wherein after attaching the device to a standard commercial dividing head or circular table, the same may be used for any operation for which it previously had been employed, as for example, turning arcs in minutes and seconds where the head or table is already equipped with verniers.

Another object of the invention is to provide computing indexing mechanism wherein the whole device can be revolved on any present dividing head that revolves their "hole plate" when cutting spirals by gearing the head to the table lead screw.

Another object of the invention is to provide computing indexing mechanism wherein the device can be attached to substantially any dividing head or circular table already in use by means of suitable adaptor parts.

Another object of the invention is to provide computing indexing mechanism wherein since indexing is both simple and positive, multi-operrations at each index can be done, and quickly done, by "following through" all the indices with each operation, requiring only one tool change on the whole piece instead of making all the tool changes at each index as is now the usual practice.

Another object of the invention is to provide computing indexing mechanism wherein indexing, after "setting" is made, is positive because movement for each operation is permitted until a positive stop arrests movement and when the next index is desired, means is operated to unlock the device to allow movement until the stop again becomes operative.

Another object of the invention is to provide computing indexing mechanism wherein, since indexing is positive, the operator need not look at the device to index it, and can watch "work" and prevent "false" cutting that often happens at present.

Another object of the invention is to provide computing indexing mechanism wherein the release and operating mechanism can be operated by one hand, whereby the operator has one free hand to keep on other controls of machine at all times if he so desires.

Another object of the invention is to provide computing indexing mechanism wherein graduated wheels and dials may be readily marked, for example, the "long" marks for each "fifth" and "tenth" space can be made when the "5" and "0" appear on the counter, thereby relieving the operator of the "error provoking" counting in his mind that is necessary at present.

Another object of the invention is to provide computing indexing mechanism wherein cams can be cut by the use of "polar coordinates" because operator does not need to watch the index and can watch and properly control table feed to cut the desired cam shape.

Another object of the invention is to provide computing indexing mechanism wherein individual indexing can be done in less than half the time required at present, because operator does not need to count "turns," watch "holes," bring up "follower" or do any of the "error charged" operations inherent in present devices.

Another object of the invention is to provide computing indexing mechanism wherein a "zero-izing" counter is provided that shows at all times the number of indices that have been made, the counter also making it possible to "jump" tooth spaces, to "run off" angles by degrees, also by certain selected degrees.

Another object of the invention is to provide computing indexing mechanism wherein a counter furnishes constant visible evidence that each individual index has been entirely completed.

Another object of the invention is to provide computing indexing mechanism wherein the mechanism can be operated in a backwards direction for any amount and when moved forward again will correctly "pick up" previous index spaces.

Another object of the invention is to provide computing indexing mechanism wherein the indexing handle is always rotated in a clockwise direction. The direction of rotation of the work spindle, however, can be either clockwise or counterclockwise; selection of which is controlled by a small lever. The left-handed settings and their incident backlash problems inherent in present dividing heads are thus eliminated.

Another object of the invention is to provide computing indexing mechanism wherein the operating handle turns freely at all times, thus avoiding the necessity of lifting the spring load of the usual dividing head crank before permitting pin to enter the plate hole.

Another object of the invention is to provide computing indexing mechanism wherein by means of the addition of a "three position" change gear box and suitable connecting shafts to table lead screw, the mechanism can be used to cut, either right or left hand, a large number of different leads of a spiral, for example in the mechanism shown 2700 different leads of spiral can be cut as follows: 900 leads varying by .001 between .100" and 1.000", 900 leads varying by .010" between 1" and 10", and 900 leads varying by .100" between 10" and 100".

Another object of the invention is to provide computing indexing mechanism wherein when cutting spirals the actual lead being cut shows at all times on the dials of the device, and the device shows at all times while the cutting is taking place, the actual inches (or measure) of spiral lead that the cutter has actually moved.

Another object of the invention is to provide a device which can be selectively set to be operated to permit a machine to spot various points on varying radii and at different selected angles, for example, locating the places for permitting the drilling of holes (of various sizes) on various selected radii from a center and at various selected angles from a selected radius (or diameter) through said center.

Another object of this invention is to provide a computing indexing device which is capable of being set and operated to cause indexing movements of predetermined increments, the device automatically stopping at each increment, it being necessary to manually operate a release after arresting of the device to permit it to be operated to the next increment, the device being so constructed and arranged that it can be reversed or backed up, and can then be operated in a forward direction or advanced to repeat the same stops at the selected increments.

With these and various other objects in view, the invention consists of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a perspective elevation of a computing indexing mechanism embodying the invention, shown as attached to the conventional worm and worm wheel of a typical commercial dividing head for transferring computation to a work spindle;

Figure 2 is a top plan view of the computing indexing mechanism illustrated in Figure 1;

Figure 3 is a transverse sectional elevation of the computing indexing mechanism, taken substantially in the plane as indicated by the line 3—3 of Figure 2;

Figure 4 is a partly developed, and partly sectioned schematic vertical section of the computing indexing mechanism, showing the connection between the setting knobs and the computing mechanism;

Figure 16:
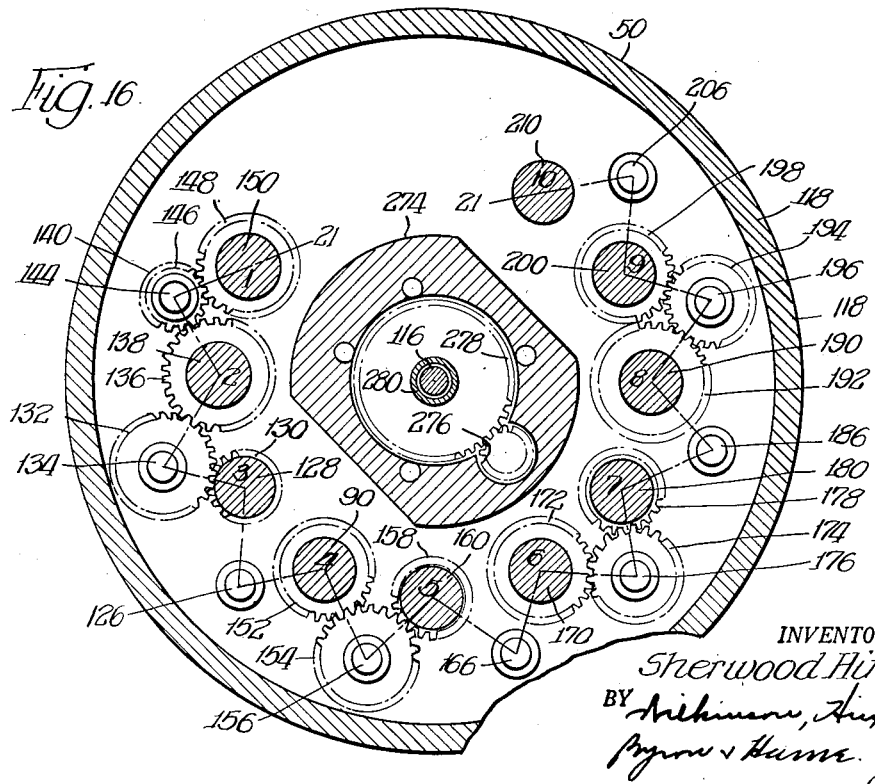
Figure 17:
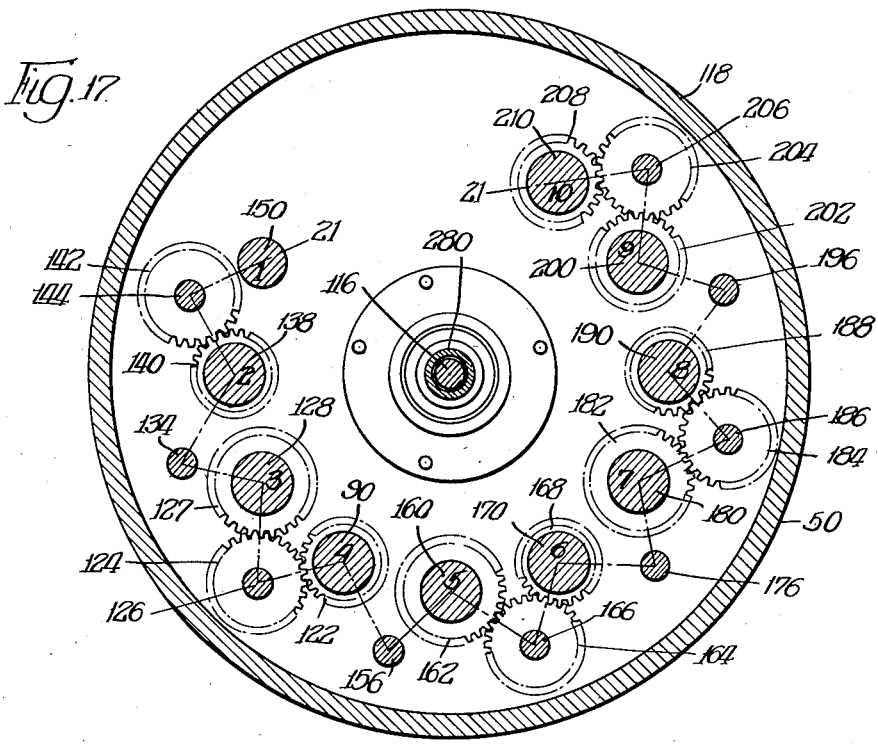

Figures 5, and 8 to 20 inclusive are sectional plan views of the computing indexing mechanism, taken substantially in the planes as indicated by the respective similarly numbered plane lines shown in Figure 3;

Figure 6 is a fragmentary sectional elevation of one of the cams and associated mechanism, taken substantially in the plane as indicated by the line 6—6 of Figure 5;

Figure 7 is a fragmentary sectional elevation similar to Figure 6, but taken substantially in the plane as indicated by the line 7—7 of Figure 5;

Figure 21 is a developed elevation showing the gear connections between the integer shafts, the gears and shafts being shown along the lines 21—21 of Figures 16 and 17;

Figures 22, 23 and 24 are fragmentary sectional elevations taken substantially in the planes as indicated respectively, by the lines 22—22, 23—23, 24—24 of Figure 2; showing the setting knobs of the device of the highest, intermediate, and lowest denominations, said knobs being operable to set the variating mechanism of the computing indexing mechanism;

Figure 25 is a fragmentary sectional elevation, taken substantially in the plane as indicated by the line 25—25 of Figure 19;

Figure 26 is a sectional elevation of the intermediate and lowest denominational dial shafts, as shown in Figures 2, 23 and 24;

Figure 27 is a plan view of the dial shafts shown in Figure 26, looking toward the left of said figure;

Figure 28 is a plan view of the shutter for the lowest denomination dial, as shown in Figure 2;

Figure 29 is a sectional elevation of the shutter shown in Figure 28, the same being taken substantially in the plane as indicated by the line 29—29 of Figure 28;

Figure 30 is a plan view of the shutter for the intermediate denomination dial, as shown in Figure 2;

Figure 31 is a sectional elevation of the shutter shown in Figure 30, the same being taken substantially in the plane as indicated by the line 31—31 of Figure 30;

Figure 32 is an elevation of one of the similar pawls shown in Figure 5;

Figure 33 is a plan view of the pawl shown in Figure 32;

Figure 34 is an elevation of another of the pawls shown in Figures 5 and 6;

Figure 35 is a plan view of the pawl shown in Figure 34;

Figure 36 is an elevation of still another of the pawls shown in Figures 5 and 7;

Figure 37 is a plan view of the pawl shown in Figure 36;

Figure 38 is a plan view of the pawl latch shown in Figures 5, 32, 34 and 36; and Figure 39 is an elevation of the pawl latch shown in Figure 38.

Referring first of all more particularly to Figure 1, the computing indexer 50 is shown in cooperative relation with the conventional worm and worm wheel of "dividing head" 52 for transferring computations to the work spindle 54, the work spindle being rotatably mounted in the housing 56, and provided with the worm wheel 58 adapted to be rotated by the worm 60. Worm 60 is mounted on a suitable worm shaft 62 rotatable in the bearing 64 carried by the housing 52, and the bearing 64 is provided with the mounting flange 66. An adaptor plate 68 is mounted between the mounting flange 66 and the control housing 70 which is suitably secured to the adaptor plate 68.

The shaft 62 is provided with the 48-tooth worm shaft drive gear 72 (Figures 3, 4, 20 and 25) extending within the housing 70 and provided with the brake drum 74 (omitted on Figure 4), adapted to be frictionally engaged by the spring-pressed plungers 76 (Figures 3 and 20) mounted in the shifter plate 78 for arresting movement of the gear 72, thus preventing backlash or "coasting" when indexing from causing error in registration of the device.

Figure 18:
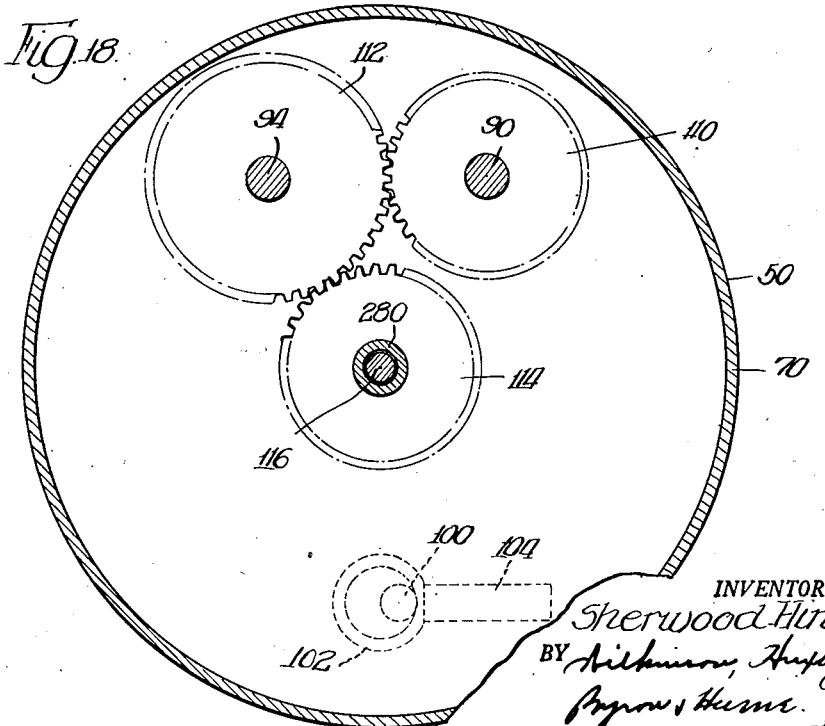

In the device illustrated, which is adapted to be operated to select divisions from 1 to 2198, 48-tooth gear 72 meshes with the 25-tooth gear 80, pivotally mounted by stub shaft 82 on the shifter plate 78. There are two gears 80 mounted on stub shafts 82, one of said gears 80 being provided with the 50-tooth gear 84 (Figures 3, 4, 19 and 25) and the other of said gears 80 being provided with the 50-tooth gear 86, (Figures 19 and 4). Shifter plate 78 is adapted to be moved so that gear 84 may mesh with the 32-tooth gear 88 (Figures 4, 19 and 21) fixedly mounted on shaft 90, and said shifter plate is adapted to be moved so that gear 86 may mesh with the 40-tooth gear 92 rotatably mounted on shaft 94 (Figures 3, 18 and 19). When gears 84 and 88 are in mesh, gears 86 and 92 are disengaged, and vice versa.

In order to effect shifting movement of the shifter plate 78, said plate is provided with the notch 96 (Figures 25 and 20) in which shoe 98 is mounted. Eccentric 100 rotatably extends into said shoe, said eccentric being provided on the hollow shaft 102 to which the lever 104 is connected. Shaft 102 is rotatably mounted about its axis in the housing 70 and a spring-pressed plunger 106 mounted in the shaft 102 bears against a plate 108 mounted on the housing 70 serving to prevent accidental shifting of the lever 104. Rotation of the lever 104 in one direction, for example, clockwise in Figure 20, causes the shifter plate 78 to move in a clockwise direction causing gears 86 and 92 to mesh, in which case gears 84 and 88 are disengaged. Movement of the lever 104 to the position illustrated in Figures 19 and 20 shifts the member 78 whereby gears 84 and 88 are meshed, and gears 86 and 92 are disengaged.

Gear 88 is provided integrally with the 40-tooth gear 110 (Figures 4, 18 and 21) which also meshes with the 50-tooth gear 112 which is integral with the gear 92 (Figures 3, 18 and 19). Gear 112 meshes with the 40-tooth gear 114 (Figures 3, 4 and 18) non-rotatably mounted on the handcrank shaft 116 (Figures 2 to 5, 8 to 12, and 5 to 17). When the lever 104 is shifted to its other position (from that shown in Figures 19 and 20), whereby gears 84 and 88 are disengaged and gears 86 and 92 are engaged, gear 72 then is connected through gears 80 and 86 to gear 92 (Figure 19) which in turn is connected through gears 112 and 114 to shaft 116 (Figures 3 and 18).

Main housing 118 is suitably secured to the housing 70 and is provided with a lower wall 120 in which shaft 90 is rotatably mounted and on which shaft 94 is supported. Shaft 90 (Figures 4, 19 and 21) is provided with the 18-tooth gear 122 (Figures 4, 17 and 21) which meshes with the 24-tooth idler 124 pivoted as at 126 to lower wall 120 of housing 118, the idler meshing with the 24-tooth gear 127 non-rotatably mounted on the "3" shaft 128 rotatably mounted on the lower wall 120, said shaft being non-rotatably provided with the 18-tooth gear 130. Gear 130 meshes with the idler gear 132 (Figures 16 and 21) pivotally mounted as at 134 to the wall 120, said idler meshing with the 27-tooth gear 136 non-rotatably mounted on the "2" shaft 138 pivotally mounted on the wall 120. Shaft 138 is non-rotatably provided with the 20-tooth gear 140 meshing with the 25-tooth idler 142 pivotally mounted as at 144 to the wall 120 and non-rotatably provided with the 15-tooth gear 146. Gear 146 meshes with the 24-tooth gear 148 non-rotatably mounted on the "1" shaft 150 which is rotatably mounted on the wall 120.

Shaft 90 is also non-rotatably provided with the 25-tooth gear 152 meshing with the 24-tooth idler 154 rotatably mounted as at 156 on the wall 120, said idler meshing with the 20-tooth gear 158. Gear 158 is non-rotatably mounted on the "5" shaft 160 rotatably mounted on the wall 120, said shaft being non-rotatably provided with the 24-tooth gear 162. Gear 162 meshes with the 24-tooth idler 164 rotatably mounted as at 166 to the wall 120, said idler meshing with the 20-tooth gear 168 (Figures 3, 17 and 21) non-rotatably mounted on the "6" shaft 170. Shaft 178 is the upper part of shaft 94 (Figure 3) and is non-rotatably provided with a 21-tooth gear 172 meshing with the 22-tooth idler 174, said idler being pivotally mounted as at 176 on the wall 120. Idler 174 meshes with the 18-tooth gear 178 non-rotatably provided on the "7" shaft 180, said shaft being non-rotatably provided with the 24-tooth gear 182.

Gear 182 meshes with the 24-tooth idler 184 rotatably mounted as at 186 on the wall 120. Idler 184 meshes with the 21-tooth gear 188 non-rotatably provided on the "8" shaft 190 pivotally mounted on the wall 120, said shaft being non-rotatably provided with the 27-tooth gear 192. Gear 192 meshes with the 22-tooth idler 194 pivotally mounted as at 196 on the wall 120 and meshing with the 24-tooth gear 198. Gear 198 is non-rotatably provided on the "9" shaft 200, and is non-rotatably provided with the 20-tooth gear 202. Gear 202 meshes with the 20-tooth idler 204 rotatably mounted as at 206 on the wall 120 and meshing with the 18-tooth gear 208 non-rotatably provided on the "10" shaft 210, which is rotatably mounted on the wall 120. Shafts 150, 138, 128, 90, 160, 170, 180, 190, 200, 210 are non-rotatably provided with 18-tooth gears 212, 214, 216, 218, 220, 222, 224, 226, 228 and 230, respectively (Figures 21, 11, 12 and 13).

The "1" to "10" shafts, inclusive, are disposed with their axes on a common circle about the axis of shaft 116, and said shafts preferably are rotatably mounted adjacent their lower ends in the wall 120 by means of the anti-friction bearings 232 (Figure 3) and adjacent the upper ends thereof are preferably rotatably mounted in anti-friction bearings 234 carried by the spider 236 (Figures 3, 11 and 12) which is suitably carried by the supporting plate 238 supported and secured to the main housing 118. A fixed stop which, as shown is the "0," and is a mutilated 18-tooth gear 240 (Figures 21, 11 and 12), is likewise disposed so that its axis is on the common circle of the "1" to "10" shafts about the axis shaft 116.

The 15-tooth gear 242 (Figures 3, 4, 10, 11 and 12) is non-rotatably mounted on the shaft 244 rotatably mounted on the 132-tooth shifter ring gear 246, the shaft 244 being provided with the 11-tooth gear 248. The shifter ring gear 246 is rotatably mounted in a suitable track 250 provided in the spider 236. Gear 248 meshes with the 110-tooth gear 252, said gear being rotatably mounted on stationary sleeve 254 which in turn is fixedly supported on the cover plate 256 of main housing 118. Thus it will be seen that rotation of the ring gear 246 will move gear 242 to its selected position to engage the gear selected of gears 212 to 228, inclusive, on the "1" to "9" shafts or the "0" stop gear 240.

Figure 15:
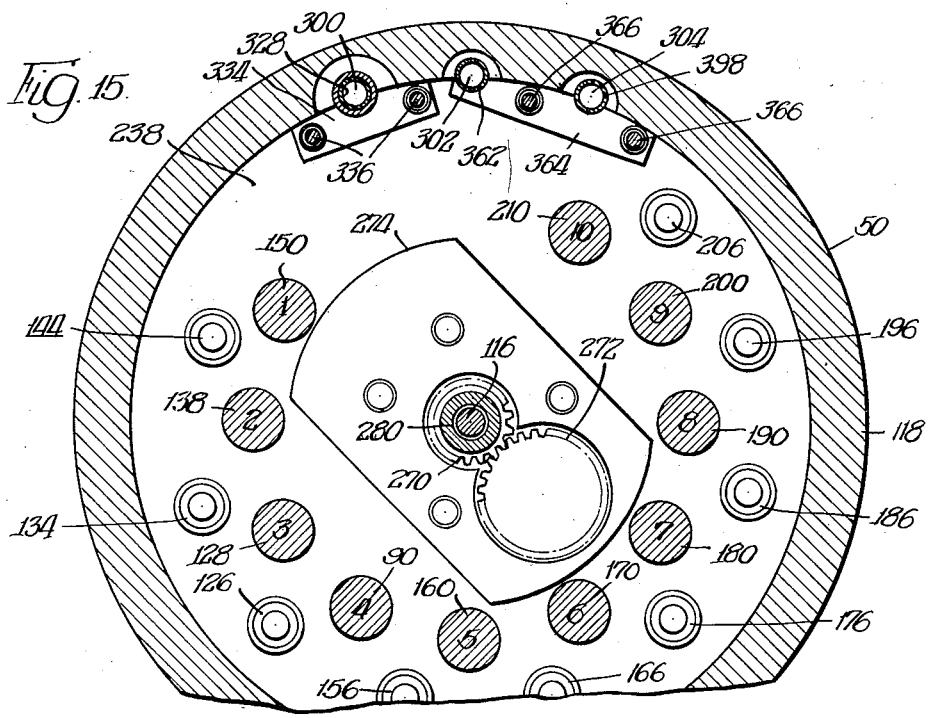

Gear 252 is provided with the 27-tooth gear 258 which meshes with the 30-tooth differential gear 260 which is pivoted to rotate about its own axis on the differential carrier 262. Gear 260 is provided with the 15-tooth gear 264 meshing with the 45-tooth gear 266 provided on the upper end of sleeve 268, said sleeve being provided at its lower end with the 16-tooth gear 270 (Figure 15). The gear 270 meshes with the 27-tooth differential gear 272 mounted to rotate about its own axis on the differential carrier 274, carrier 262 being rotatably mounted on the sleeve 268, and carrier 274 being rotatably mounted on the sleeve 280.

Gear 272 is non-rotatably provided with the 10-tooth gear 276 (Figure 16) meshing with the 32-tooth gear 278 provided on the sleeve 280, said sleeve being rotatably mounted on the shaft 116. Carrier 274 (Figures 3, 4 and 14) is provided with the 22-tooth gear 282 which meshes with the 20-tooth gear 284 which in turn meshes with gears 212, 214, 216, 218, etc., to 230 as selected. Gear 284 is pivotally mounted as at 285 on the idler carrier 286 provided with 72 teeth meshing with the 36-tooth gear 288. The gear 288 is pivotally mounted as at 290 to the supporting plate 238. Carrier 292 is pivotally mounted on the extension sleeve 239 (Figure 4) of support plate 238 and is provided with 72 teeth meshing with the 36-tooth gear 294 (Figures 4 and 12) pivotally mounted as at 296 to the supporting plate 238. The carrier 292 is provided with the 18-tooth gear 297 pivotally mounted thereon and meshing with gears 240, 212, 214, 216, 218, etc., to 228, as selected. Gear 296 also meshes with the 35-tooth gear 298 provided on the carrier 262.

In order to set the variating mechanism, the highest denominational setting or dimension shaft 300 (Figures 22, 23, 24, 1, 2, 4, 5 and 8 to 15 inclusive), the intermediate denominational setting or dimension shaft 302, and the lowest denominational setting or dimension shaft 304 are provided. Shaft 300 (Figure 22) is provided with the setting knob 306 and said shaft is rotatably mounted in case cover plate 256 extending through packing 308 therein and being provided with the 10-tooth gear 310 (Figures 22 and 9) which meshes with the 14-tooth idler 312 pivotally mounted on the bearing support 324, said idler meshing with the 50-tooth gear 314. Gear 314 is provided on shaft 316 journalled in the plate 256 and provided with the dial 318 (Figures 2, 8 and 22) having numerals from one to ten thereon, one of which may be viewed at a time through the window 320 (Figure 2) provided in the cover plate 322 carried by case cover plate 256.

Shaft 300 (Figure 22) extends through an elongated bearing in the bearing support 324 supported by main housing 118, said support being so shaped as to permit movement of the gear 310 downwardly inasmuch as the shaft 300 is adapted to be depressed for setting. Upward movement of the shaft is limited by means of the collar 326, and a compression spring 328 is disposed in the hollow end of the shaft 300, said shaft containing a plunger 330 at its lower end, which plunger is slidably secured to the shaft by the pin and slot connection 332, the lower end of the plunger abutting the stop plate 334 (Figures 22 and 15) carried by the plate 238 as through screws 336 (Figure 15). Shaft 300 is provided with the 12-tooth gear 338 (Figures 22, 14 and 4) meshing with the gear 288 and collar 326 is provided with the diametrically opposed notches 340 (Figures 22 and 13), adapted to be selectively engaged by the shaft detent 342 carried by the plate 238, engagement between said notches and detent being released when the shaft is depressed for setting.

When it is desired to set said shaft 300, knob 306 is depressed against the spring 328 (Figure 22). Gears 310 and 312 (Figures 22 and 9) remain in mesh as do gears 338 and 288 (Figures 22, 4 and 14), but the engaged notch 340 (Figures 22 and 13) is released from the detent 342. Thus the shaft 300 may be rotated causing rotation of the dial 318 (Figures 22, 2 and 8) to the selected numeral showing the setting of that particular shaft 300 and that portion of the variator associated therewith by causing gears 338 and 288 to rotate carrier 286 (Figures 3, 4, 22 and 14). Rotation of the carrier 286 will rotate the gear 284 around the axis of the shaft 116 to the selected position of gear 284 causing said gear to mesh with the proper gear of the "1" to "10"

shafts as shown by the corresponding numeral on dial 318.

Intermediate denominational shaft 302 (Figures 23, 1, 2, 4, 8 to 11, 12, 13, 14 and 15) provided with the knob 344, is journalled in cover plate 256 extending through a suitable seal 346 therein and said shaft is provided with the 10-tooth gear 348 (Figures 22 and 9) meshing with the 23-tooth idler gear 350 pivotally mounted on bearing support 324, the gear 350 meshing with the 50-tooth gear 352 fixedly mounted on the shaft 354 (Figures 2, 23 and 8). Shaft 354 is provided with the dial 356 non-rotatably mounted thereon and being provided with indicia in the form of numerals from zero to nine, one of which according to the setting is adapted to be viewed through the window 358 provided in the cover plate 322.

Shaft 302 (Figure 23) is also slidably journalled in bearing support 324 which permits axial movement of said shaft, said shaft being provided with the spring 360, the lower end of which contains the plunger 362 slidably secured in the end of the shaft by the pin and slot connection 364, the lower end of this plunger abutting the support 364 suitably secured by bolts 366 to the support 238 (Figures 3 and 15).

Shaft 302 is provided with the 12-tooth gear 368 (Figures 23, 4 and 12) meshing with the gear 294 which in turn meshes with the teeth of the carrier 292, and upward movement of the shaft is limited by gear 368 engaging support 324. Detent 370 is fixed to shaft 302 (Figures 23 and 13) and is provided with diametrically opposite notches 372 which are adapted to be engaged by the fixed detent 374 disposed on plate 238. The engagement between the notches and the fixed detent occurs when the shaft 302 is in its uppermost position.

Figure 12:
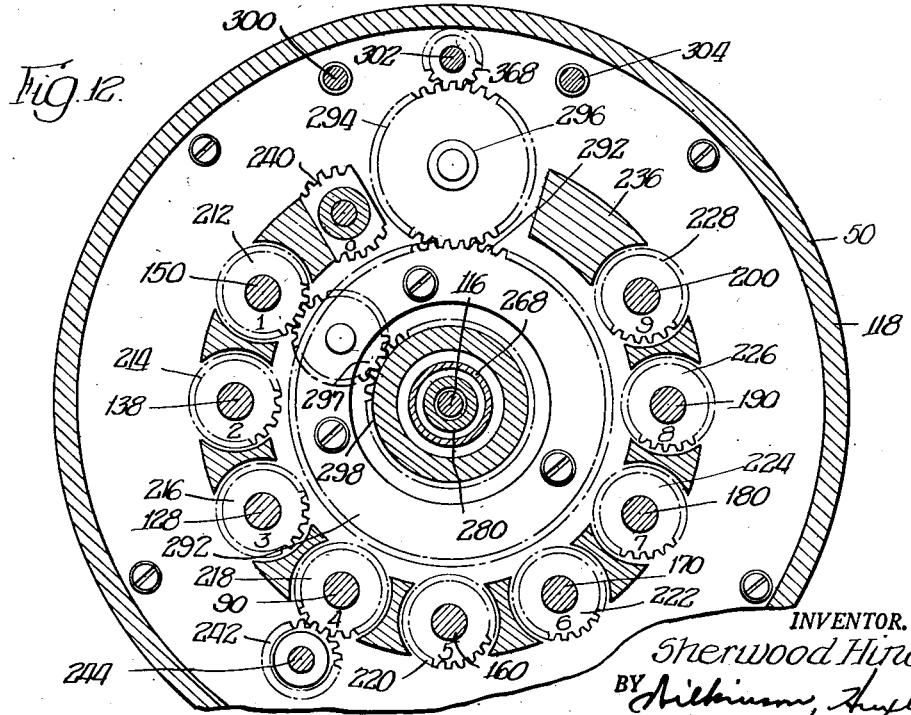

When it is desired to set that part of the variator controlled by shaft 302, knob 344 is depressed, releasing engagement between detent 370 and fixed detent 374, whereupon the shaft 302 may be rotated. Engagement will continue between gears 348 and 350 (Figures 23 and 9) and between gears 368 and 294 (Figures 23 and 12). Thus rotation of the shaft 302 will cause rotation of the dial 356 (Figures 23, 2 and 8) to its selected position where the proper numeral may be read through the window 358, and carrier 292 (Figures 3, 4 and 12) will be rotated through idler 294 by gear 368. Rotation of the carrier 292 to selected position will cause the gear 296 to move to its selected position engaging the selected gear or shafts "1" to "9" or the "0" gear 240, whichever the case may be, and the corresponding numeral will appear in window 358.

Shaft 304 (Figures 24, 2, 4 and 8 to 15 inclusive) is provided with the setting knob 376 and is journalled in the cover plate 256, extending through a suitable seal 378 therein, the shaft being provided with the 10-tooth gear 380 (Figures 24 and 9) meshing with the 18-tooth idler 382 pivotally mounted on the bearing support 324 and provided with the 9-tooth gear 384 which meshes with the 50-tooth gear 386 fixedly mounted on the shaft 388, said shaft being journalled in the plate 256 and provided with the dial 390 (Figures 24, 8 and 2) having indicia thereon numbered from "0" to "9," the selected indicia being adapted to be viewed through the window 392 provided in the cover plate 322.

Shaft 304 is slidably journalled in bearing support 324 (Figure 24) and is provided with the 11-tooth gear 394 (Figures 24, 4 and 11) meshing with the carrier 246, whereby rotation of the shaft 394 rotates carrier 246. Shaft 304 is provided with the hollow lower end for receiving the spring 396, the lower end of said spring engaging the plunger 398, slidably secured to the shaft by the pin and slot connection 400, the lower end of the plunger engaging the support 364 (Figures 24 and 15).

Figure 11:
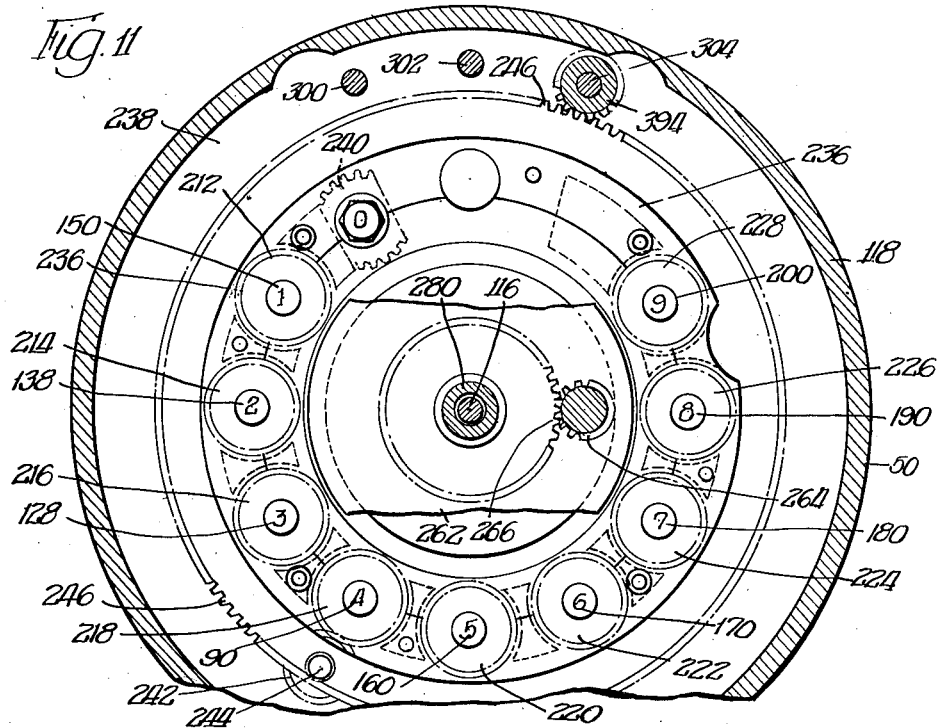

Shaft 304 (Figures 24 and 13) is provided with the stop collar and detent 402 for limiting upward movement of the shaft 304 by engagement of the detent 402 with the support 324, said detent 402 being provided with the notch 404 adapted to be engaged by the fixed detent 406 provided on the supporting plate 238. The notch and the detent are in engagement when the shaft is in its uppermost position and a numeral is completely shown in window 392 (Figure 2) so when it is desired to rotate the shaft 304 to a new setting, the knob 376 is depressed, releasing the notch 404 from the detent 406, thus permitting rotation of said shaft. Longitudinal movement of the shaft does not disengage gears 380 and 382 (Figures 24 and 9), nor does it disengage gear 394 from the teeth of carrier 246 (Figures 24, 4 and 11). Rotation of the shaft 304 causes the dial 390, (Figures 2 and 8) to be rotated to the selected position where the numeral 392 and the carrier 246 will be rotated to its corresponding selected positon where gear 242 (Figures 3, 4, 10, 11, 12 and 24) will be rotated to engage the selected gears on the "1" to "9" shafts or the "0" gear 240.

Shaft 116 is provided with the operating crank 408 (Figures 2 and 3) and sleeve 280 is non-rotatably provided with the ratchet 410 (Figures 5 and 3), the ratchet being provided with a single notch 412. Ratchet plate or ring 414 (Figures 3, 5, 6 and 7) is secured to the ratchet 410 and is provided with five equally spaced notches 416 of the same shape as notch 412, the ring and ratchet being so relatively positioned that one of said notches 416 is aligned with said notch 412. Sleeve 280 is non-rotatably provided with the 57-tooth gear 418 (Figures 3 and 8) which meshes with the 57-tooth gear rotatably mounted on the case cover plate 256 by means of shaft 422 journalled at its upper end in top cover plate 424, shaft 422 being provided with a spiral gear 426 (Figures 3 and 5) meshing with spiral gear 428, the ratio of said spiral gears being one to two. Spiral gear 428 is non-rotatably provided on shaft 430 connected to the counter shaft (not shown) of resettable counter 432 (Figure 2), the counter being provided with the same number of numeral wheels that there are windows (320, 358 and 392) and dials (318, 356 and 390), in this case three wheels 434, 436, and 438 are provided corresponding respectively to the dials 318, 356 and 390. Reset means 440 is provided zeroizing the counter.

Gear 442 (Figures 3, 6, 7 and 8) of the same outside diameter as gear 418 but having 60 teeth is rotatably mounted on ratchet 410 (Figures 3 and 5) and is provided with a clamp ring 444 which non-rotatably mounts ratchet 446 of one tooth, and ratchet 448 of ten teeth, to said gear 442. The outside diameters of ratchets 446, 448, 410 and 414 are the same.

Cam 450 (Figures 3 and 5) is provided with four notches 452, 454, 456 and 458, the cam being provided with a shaft 460 journalled in top cover plate 424 and secured to the index lever 462 (Figures 1, 2 and 3), the lever being provided with a suitable finger-tip control 464 for oscillating said lever. Top cover plate 424 adjacent to the shaft 460, is provided with a circular spring groove 466 (Figures 2 and 3) in which the compression coil spring 468 is disposed. One end of the spring 468 is secured to or abuts a fixed abutment 470 disposed in the groove 466, and the other end of said spring is secured to or abuts a fixed abutment 472 provided on the index lever 462. Cam 450 is provided with two felt dust seals 459, respectively, abutting shaft 116 and the underside of cover plate 424 for preventing admission of dirt, grit, etc.

Top cover plate 424 is provided with five notches 474, 476, 478, 480 and 482 (Figure 2) which are disposed opposite indicia provided on the fixed range dial plate 484 secured to the top cover plate 424. In the device illustrated, the range opposite 474 is from "1" to "10"; the range opposite the notch 476 is from "11" to "99"; the range opposite notch 478 is from "100" to "1099." The numbers opposite the notch 480 are from "1100" to "2198." There is an "Off" indication opposite notch 482.

Range lever 486 (Figure 2) is provided with a downwardly projecting spring-pressed locating button or latch 488, said button being urged by the spring toward the lever 486 in which case it may be engaged in the selected notch, the spring permitting the button to be removed out of the notch whereby the lever 486 can be moved to a newly selected notch. Lever 486 is provided with the window 490 whereby the numerals opposite the selected notch may be readily viewed. Lever 486 is provided with the gear segment 492 journalled for rotation on the bearing 494 (Figure 3) provided on the top cover plate 424 whereby said segment may be oscillated around the axis of shaft 116, the gear segment being provided with the extension 496 provided with the lower stop 498. Stop 498 limits the lower position of lever 462, that is, the position to which it is carried by the compression spring 468.

An upper stop 500 provided on the cover plate 424 limits the upward position of the lever 462. Gear segment 492 (Figure 2) is provided with teeth of a suitable number based on 68 teeth for the complete circle, said teeth meshing with the teeth of segment 502 which is based on a gear of 38 teeth for the complete circle. Segment 502 is pivoted at 504 and is provided with the 28-tooth gear 506. Gear 506 meshes with the 25-tooth gears 508 and 510 (Figures 24 and 23) of the lower and intermediate dials 390 and 356, respectively, the axis of said dials being in alignment with shafts 388 and 354 respectively.

Gears 508 and 510 (Figures 2, 24 and 23) are provided with shutters 512 and 514, respectively (Figures 2, 28 and 30) which may be rotated, as will be later described, to mask or unmask the windows 392 and 358.

Dial 390 (Figures 2 and 24) is fixedly mounted with respect to the shaft 388 as it is rigidly connected to the dial carrier 516 (Figures 24, 26 and 27) which in turn is carried by the shaft 388. Dial carrier 516 is provided with the flange 518 to which the dial is secured, said flange being provided with the single ball depression 520 adapted to receive the ball 522. The underside of the shutter 512 is provided with the elongated ball slot 524 (Figures 28 and 29) for reception of the ball 522 under conditions to be later described.

Dial 356 (Figures 2 and 23) is likewise secured to shaft 354 through a dial carrier 526 (Figure 23) similar in all respects to dial carrier 516, being provided with the ball depression 528 for reception of the ball 530, said depression being provided in the flange 532 of the carrier. The underside of shutter 514 is also provided with the elongated ball depression 534 (Figures 30 and 31) for the reception of the ball 530 under certain conditions to be later described.

Pawl supports 536 and 538 (Figures 3 and 5) are disposed on opposite sides of the shaft 116 and are provided with identical pawls 540 and 542 (Figures 3, 5, 32 and 33) diametrically pivoted at 544 and 546 to said supports respectively, said pawls being provided with diametrically disposed identical wiper portions 548 and 550. The wiper portions 548 and 550 are urged in a counter-clockwise direction about the respective shafts by means of the springs 552 and 554 respectively, the end of said springs being respectively connected as at 556 and 558 to the pawls, the opposite ends of the springs being connected as at 560 and 562 to the respective pawl supports 536 and 538.

Pawls 540 and 542 are each provided with the pivotal pawl latches 564 and 566 (Figures 5, 32, 38 and 39), said pawl latches being pivoted thereto as at 568 and 570. The pawl latches are frictionally engaged by means of a spring-pressed plunger (not shown) disposed in passages 572 and 574. Pawls 540 and 542 are provided with the surface 576 (Figures 32 and 33) which is adapted to engage the periphery of cam 450 (Figure 5) and enter the notches 452, 454, etc. Pawls 540 and 542 are also provided with surface 578 which surface, together with the surface 580 of pawl latch 564 (Figure 38), engages the periphery of ratchet ring 414 (Figure 5), being adapted to enter the slots 416 thereon.

"Tens" pawl 582 (Figures 5, 7, 34 and 35) is pivotally mounted as at 584 to the pawl support 536 and is provided with the wiper 586 urged in a counter-clockwise direction around the pivot 584 by means of the spring 588, one end of the spring being secured to the pawl as at 590 and the other end of the spring being secured as at 592 to the support. The pawl latch 594 is similar to latch 564 and is pivoted as at 596 to the pawl 582. As before, the pawl latch 594 is frictionally engaged by means of a spring pressed plunger (not shown) disposed in passage 598. The wiper 586 is provided with the surface 600 adapted to engage the periphery of the cam 450 and enter into the notches 452, 454, etc., thereof. The pawl latch 594 engages the periphery of the ratchet ring 414 and the portion 602 of the wiper contacts the periphery of ratchet ring 414 and the continuing surface 604 of the wiper contacts the periphery of the ratchets 410 and 448.

"Unit" pawl 606 (Figures 5, 6 and 31) is pivoted as at 608 to the support 538 and is provided with the wiper 610, said wiper being urged in a counter-clockwise direction by means of the spring 612 secured at one end 614 to the pawl end at the other end 616 to the support 538. The wiper end of the pawl is slotted for the reception of the pawl latch 618, similar to latch 564 and pivoted to the pawl as at 620. As before, a spring-pressed plunger (not shown) is mounted in the passage 622 for frictional engagement with the pawl latch. The wiper is provided with the surface 624 for engagement with the periphery of the cam 450 and the pawl latch 618 engages the periphery of the ratchet ring 414. The wiper is also provided with the surface 626 which engages the periphery of the ratchet ring 414 and is provided with the surface 628 which engages with the periphery of the ratchet 410. The wiper is then provided with the recess 630 preventing any engagement with the ratchet 442 and is then provided with the surface 632 adapted to engage the periphery of ratchet 446.

Restoring cams 634 (Figures 3 and 5), 636, 638, 640 are so disposed that the ends thereof will contact the inner ends of the respective pawl latches for a certain operation of the pawl whereby they will be moved to a predetermined position for the purpose to be later described.

The device herein described will thus readily divide a circle into ten minutes, with a very simple setting and operation.

Further, shaft 430 (Figure 5) which drives the counter 432, is provided at the opposite end with a take-off 431 which rotates in accordance with the setting of the knobs 306, 344 and 376. This take-off may be used in other ways than with a shaft 54, as for example, it may be used in the cutting of spirals as it may be connected as through gearing to the lead screw of a machine table to which the dividing head or indexing device is attached.

Thus the lead of any spiral would be determined by the gearing interposed between the table and the take-off 431.

Relative movement of the take-off 431 and the rotation of the spindle 54 is determined by the setting of knobs 306, 344, and 376, for example, in the device illustrated one hundred and twenty complete turns of the crank 408 causes the spindle 54 to rotate 360 degrees. With the setting shown, namely 114, the take-off 431 will rotate 11.4 times. In other words, in the machine shown, the number of turns of the spindle 431 for one complete turn of work spindle 54 will be indicated in the windows 320, 358 and 392 as tens, units and tenths of turns.

As previously described shifter plate 78 can be moved back and forth by rotation of shifter lever 104. The purpose of this shift is to cause the work spindle 54 (Figure 1) to move in a clock or counter-clockwise direction as desired and still have the operating handle 408 of the indexing device always turn in a clockwise direction. This is desirable, as one of the biggest sources of error in the operation of the present dividing head is due to the fact that because of the nature of the work being performed, the work spindle may have to be rotated in either direction, and since that forces the operator to turn his handle in the opposite direction, he runs into no end of confusion due to his inability to properly control back lash of the gearing in the head. So, therefore, this feature of one direction of movement of operating handle 408 is an important one. Also, this reversing lever 104 is a necessary adjunct to controlling the "hand," either right or left, in cutting spirals, as described above. This simplicity of controlling the hand of the spiral is an important feature as some machines can cut a right-hand spiral much easier than they can cut a left-hand, and vice versa.

*Operation*

Assuming that the device is to be set to divide a circle into 114 parts, or, in other words, that the handle 408 (Figure 3) is to be rotated the proper distance to cause the spindle 54 (Figure 1) to be rotated 1/114 part of 360 degrees at a time, knob 306 (Figures 22, 1, 2 and 4) is depressed and rotated to a position where the dial 318 (Figure 8) reads "1" through the window 320 (Figures 2 and 22). This will cause gear 338 (Figures 22, 4 and 14) to rotate carrier 286 to a position where gear 284 engages the gear 212 on the "one" shaft (Figures 14 and 21).

Knob 344 is depressed and rotated until the numeral "1" on dial 356 (Figure 8) is read through the window 358 (Figures 2 and 23). Rotation of the knob 344 will cause the shaft 302 to rotate gear 338 (Figures 23, 4 and 12) to cause the carrier 292 to be rotated to a position where the gear 287 engages the gear 212 (Figures 12 and 24) of the "1" shaft.

Knob 376 is depressed and rotated until the number "4" of dial 390 (Figure 8) can be read through window 392 (Figures 2 and 24). Rotation of the knob 376 will cause the shaft 304 to rotate gear 394 (Figures 24 and 11) which in turn will rotate carrier gear 246 to a position where the gear 242 engages gear 218 (Figures 11, 21 and 4) of the "4" shaft.

In order to make these settings, the button 488 (Figure 2) must be in engagement with either of the notches 478, 480 or 482. This setting cannot be effected if the button 488 is in engagement with either notches 476 or 474.

Assuming that dials 356 and 390 (Figures 2 and 8) are set to zero, in that case carriers 286 (Figure 14) and 292 (Figure 12) will be set to a position where gears 284 and 296 engage the zero gear 249 (Figures 14, 12 and 21). (It will be noted that dial 318 cannot be set to zero so that there is no engagement possible between gear 284 and the zero gear 248.) If then, the button 488 (Figure 2) is moved to engage notch 474, range lever 486 will move the gear 492 causing movement of the gear 506 through segment 502, in turn rotating shutters 512 and 514 (Figures 2, 23 and 24) to a position to cover windows 392 and 358. It is then possible to depress and rotate knob 306 to select the numeral desired which will cause a setting whereby a circle may be divided in up to ten parts.

When windows 392 and 356 are masked by the respective shutters, knobs 376 and 344 cannot be rotated, because the balls 522 and 530 disposed in recesses 520 and 528 will be opposite the flat under portion of the shutters 512 and 514. In other words, they will not be able to enter the recesses 524 or 534, and therefore, will not permit movement of the dials 390 and 356.

However, if the button 488 is moved to engage in notch 476 setting can be effected from "11" to "99." Movement of the button 488 to engage in notch 476 will cause the range lever 486 to be rotated which will cause the gear segment 492 to rotate gear 506 which in turn will move shutter 514 to unmask the window 358, but although there will be a slight movement of shutter 512, it will not be sufficient to unmask window 392. Having unmasked window 358, dial 356 can be rotated by knob 344 because the underside of shutter 514 will be moved to a position where the ball may enter the recess 534 (Figures 30 and 31) at which time it will have moved out of recess 528 and thus permit setting of the knob 344. Similarly, when the button 488 is moved to engage the notch 478, lever 486 will further rotate shutter 512 to unmask window 392 which will permit the knob 376 to be set inasmuch as the underside of shutter 512 will have been moved to a position where the ball 522 may enter recess 524 (Figures 28 and 29) at which position it will have moved out of its recess 520.

Further movement of button 488 into positions to engage notches 480 and 482 will also move gear 506 and shutters 512 and 514 in a direction away from masking the windows 356 and 392; however, no change of relation between balls 522 and 530 and dial carriers 526 and 516 will result due to the lengths of the slots 524 and 534 of shutters 512 and 514 respectively. Conversely, unless the dials 390 and 356 are set to "0," the respective windows cannot be masked inasmuch as the respective balls 522 and 530 cannot leave their recesses 524 and 534 to be received in their recesses 520 and 528.

Having set the dials 318, 356 and 390 to the desired setting, in this case 114, the crank 408 is rotated in a clockwise direction (as viewed in Figure 2) until the "register is picked up" in which case the proper one of the pawls 540, 582, 542, or 606 will have engaged in one of the notches of the ratchet ring 414. The register is "picked up" when the effective operating pawl is seated in the notch of ratchet ring 414. The counter 432 is then reset to "0." In the present setting of the computing indexing device, namely 114, awl 540 would be the proper pawl to engage in a notch in ring 414, and inasmuch as pawl 540 is effective, the other pawls will be held out of engagement with the periphery of the ratchet ring 414 as the diameter of the cam 450 is slightly more than that of the ratchet ring 414, as well as ratchet 410, 448 and 446.

Notches 452, 454, 456, and 458 of cam 450 are so disposed with respect to each other and with respect to the pawls, and are so shaped that the proper pawl or pawls are effective depending on the setting of range lever 486 and engagement of button 488 (Figure 2) in notches 474, 476, 478, and 480. In other words, when the button 488 is set in notch 474, notch 454, (Figure 5) is positioned to permit pawl 606 to be effective, that is, to enter notch 454 of cam 450. When button 488 is engaged in notch 476, notch 452 of cam 450 is disposed so that pawl 582 is effective. When button 488 is in engagement with notch 478, pawl 540 is rendered effective by notch 458 of cam 450, and when button 488 is in engagement with notch 480 latches 540 and 542 are rendered effective by means of the notches 458 and 454 of cam 450. And finally when button 488 is in engagement with notch 482 all pawls are rendered ineffective and crank 408 can be rotated at will and no stop will be effective.

After properly setting the device as above set forth, crank 408 is rotated in a clockwise direction, causing shaft 116 to rotate gear 114 (Figures 3 and 4). Gear 114 rotates shaft 62 (Figures 1, 3 and 4) through gears 112, 110, 88, 84, 80 and 72. It is then desirable to arrest rotation of shaft 116 after it has been rotated through 1/114 part of 360 degrees. This is done as rotation of the shaft 116 rotates the "1" to "10" shafts (Figures 21, 11 to 17) through shaft 90. Gear 218 (Figures 21, 4 and 12) will rotate gear 242 which in turn will cause gear 248 (Figures 4 and 9) to rotate gear 252 which in turn rotates gear 258 (Figures 3, 4 and 10) causing rotation of gear 260, gear 260 (Figures 3, 4 and 10) causing gear 264 to rotate gear 266 and consequently sleeve 268.

Sleeve 268 will cause gear 270 (Figures 3, 4 and 15) to rotate differential gear 272, causing gear 276 (Figures 3, 4 and 16) on gear 272 to rotate sleeve 280 through gear 278. Gear 212 (Figure 12) will cause rotation of the gear 297 which in turn will rotate carrier 262 (Figures 3 and 4) through gear 298, rotation of the carrier 262 in turn causing rotation of gear 266 through gear 264. Rotation of gear 266 in turn modifies the movement of sleeve 268, and consequently, the rotation of sleeve 280 (Figures 3, 4 and 25) through gears 270, 272, 276 and 278. Rotation of gear 212 (Figures 3, 14 and 21) causes rotation of gear 284 which rotates carrier 274 through gear 282 which in turn causes modified movement of gear 272, and consequently of sleeve 280 through gears 276 and 278. The resultant modified movement through the differential causes movement of the sleeve 280 in accordance with the setting. Rotation of the sleeve 280 in accordance with the setting of the device causes rotation of gear 418 (Figures 3, 6, 7 and 8), ratchet 410, and ratchet 414 and inasmuch as the device is set for 1/114 part of a circle, the ratchet 414 will move from a position where pawl 540 (Figure 5) has just been disengaged from one notch 416 of ratchet ring 414 until it enters the succeeding notch.

When the wiper of pawl 540 (Figure 5) enters the succeeding notch 416, it will arrest rotation of the gearing, and consequently of handle 408, and of course, will necessarily stop movement of the work spindle 54 (Figure 1). This movement of the spindle 54 will be 1/114 part of 360 degrees. When the handle 408 is arrested during its first movement, the numeral "1" will appear on counter wheel 438 (Figure 1) of counter 432 and each succeeding movement which is arrested after a corresponding movement will be registered on counter 432 and can be read at any time to ascertain at a glance how many divisions of a circle (360°) have been made.

As there are five notches 416 in ring 414, said ring will move ⅕ of 360 degrees. As the gears 418 and 420 (Figures 3 and 8) are a ratio of 1 to 1 and as gears 426 and 428 are a ratio of 1 to 2, shaft 430 will move 1/10 of 360 degrees causing proper registration of the numeral wheels. After rotation of handle 408 has been arrested, in order to permit the handle to be turned through the next 1/114 part of a circle, the index lever is moved to contact stop 500 and is released.

Movement of the index lever 462 (Figure 2) to contact the stop 500 will cause movement of the cam 450 (Figure 5) which in turn will cause movement of the wiper of pawl 540 to rotate the pawl in a clockwise direction. Rotation of the pawl in a clockwise direction will cause the ratchet ring engaging portion of the pawl latch 564 to move out of the notch, after which the other end of the pawl latch 564 will engage the restoring cam 634 to cause the ring engaging portion of the pawl latch 564 to move to a position where it rides on the periphery of the ratchet ring 414. With such an arrangement the pawl, having once been moved out of its notch, will not fall back into that same notch but can only enter the succeeding notch. Thus it is not necessary to hold the pawl out of a notch, and release lever 462 (Figure 2) need only be moved to engage stop 500 and then can be instantly released to return by its own spring action whereupon the crank 406 may be turned. Thus it is only necessary for an operator to use one hand in the operation of the device. The above operation is continued for the particular setting until the circle is completely divided or the spindle 54 is moved the desired amount.

Pawl 540 alone will be used, as above described, for any number in the range determined by the engagement of the button 488 and notch 478. In the device shown this is from 100 to 1099. It will be noted that this is possible because dial 318 is from "1" to "10." When the button 488 is shifted to notch 480, in effect twice the number of divisions of a circle are selected as where button 488 is in engagement with notch 478. This is accomplished by the lever 486 shifting cam 450 to a position to permit pawls 540, and 542 to be effective. The wipers of these pawls, as was pointed out, are 180 degrees apart, and as the notches in the ratchet 414 are an odd number, this will permit twice the number of equal stops to be effected as was effected when the button 488 was in engagement with the notch 478. It is further noted that this operation follows as latches 450 and 452 are not only oppositely disposed but are identical in construction and operation.

When it is desired to select a number between "11 and 99," as for example "59," knob 376 will first be depressed and rotated to move dial 390 to zero, if it is not already at zero. Button 488 (Figure 2) then will be moved to engage the notch 476 in which case the dial 484 reads "11 to 99" in the window 490. When index lever 486 is moved so that the legend "11 to 99" appears in window 490, the shutter 512 will be moved to mask the window 390. Windows 320 and 358 will, of course, not be masked. Knob 344 can then be depressed and rotated until the numeral in window 358 reads "9." In reaching that position gear 368 will have rotated carrier 292 through gear 294 to cause gear 297 (Figure 12) to mesh with gear 228 (Figures 21 and 12) of the "9" shaft 200.

Knob 306 may then be depressed and rotated to cause gear 338 to rotate carrier 286 through gear 288 to cause gear 284 (Figure 14) to mesh with gear 220 (Figure 21) of the "5" shaft 160. Since dial 390 is already set at zero, gear 242 (Figures 11 and 12) will have been moved to engage the fixed gear 240, thereby preventing rotation of that part of the variator controlled by gear 242, i. e., gear 252 and gear 258 will be prevented from rotating so the take-off therefrom will be ineffective.

After the device has been set to "59," the pawl 582 (Figure 5) is effective and the other pawls are inoperative, having been moved to inoperative position by the periphery of cam 450, the notch 452 being effective to permit the cam 582 to be operative.

Initially, as above described, the counter 432 will have been zeroized after the register has been "picked up." Lever 462 (Figure 2) is moved in a clockwise direction to engage the stop 500, causing the cam 450 (Figure 5) to raise the pawl 582 out of notch 452, the latch pawl 594 operating in the same manner as before described, being moved to its supporting position by means of the restoring cam 638. Lever 462 is released returning to the position shown in Figure 2 where it abuts stop 498. The handle 408 is rotated in a clockwise direction and the pawl 582 will not enter any of the other notches 416 because the depth of the pawl surface 604 (Figures 7 and 34) is such that the pawl is prevented from falling as it engages the periphery of ratchet 410.

After the ratchet plate 414 has gone 360 degrees, the pawl is prevented from entering the initial notch 416 because the difference in the number of teeth between gear 442 (Figures 3 and 8) and gear 418 is such that during one revolution gear 442 loses 1/20 of a revolution. This will dispose the periphery of ratchet 448 (Figure 6) to the surface 604 of the wiper of pawl 582 and prevent the wiper from entering either the single notch in ratchet 410 or the initial notch 416 in ratchet plate 414. However, at the end of the second revolution of the ratchet ring 414 another 1/20 of a turn will have been lost by gear 442, and as ratchet ring 414 rotates with said gear, the second 1/20 loss will dispose one of the ten notches of the ratchet 448 (Figure 6), as well as the one notch of ratchet 410 so that they are in line with the initial notch 416 of the ratchet ring 414, and the wiper of pawl 582 will then enter the notch in ring 414 arresting movement of handle 408 and work spindle 54 (Figure 1) after the latter has travelled 1/59 of 360 degrees. Succeeding equal parts of a circle may be moved as before described with respect to the first example, that is, by moving lever 462 to engage stop 500, releasing said lever, and operating the handle 408, the number of operations appearing on the counter 432.

If, for example, it is desired that the device be set to divide a circle (360°) by "7," knob 376 is depressed and rotated to move the dial 390 so that the zero numeral is read through the window 392, if this has not already been done. Knob 344 is depressed and rotated until the zero numeral of dial 356 shows in the window 358, unless this zero setting has already been made. Button 488 (Figure 2) is disengaged from notch 476 and the index lever 486 is moved to a position where the button 488 may engage in the notch 474, whereby the legend "1 to 10" is read through the window 490. Rotation of the lever 486 causes gear segment 492 (Figure 2) to rotate the shutters 512 and 514 to mask the windows 392 and 358.

Knob 306 is depressed and rotated until the dial 318 is moved to a position where the numeral "7" appears in the window 320. Rotation of the shaft 300 to thus position the dial 318, causes gear 388 (Figures 14, 4 and 22) to rotate carrier 286 through gear 288 to a position to cause gear 284 to engage gear 224 (Figures 21 and 14) of the "7" shaft 180. It is understood, of course, that gears 297 (Figure 12) and 242 (Figures 11 and 12) are in engagement with the zero stop gear 240, having been moved to that position when dials 356 and 390 were moved to zero. Rotation of the index lever 486 to its proper position where the button 488 is in engagement with the notch 474 causes cam 450 (Figure 5) to be moved to render all pawls inoperative except pawl 606. When the register is "picked up," as above described, by rotating crank 408, ratchet ring 414 will be moved to a position where the wiper of cam 606 engages in one of the notches 416. After the register is "picked up" counter 432 is zeroized.

Movement of the index lever 462 in a clockwise direction to engage stop 500 causes the pawl 606 to be moved in a clockwise direction, raising the pawl out of its initial notch 416, the pawl latch 618 being moved to its supporting position on the periphery of the ring 414 in a manner similar to that described with respect to the other pawl latches. As before, there is only one notch 416 of the ring 414 available as it has five notches and ratchet 410 has only one notch, and due to the ratio of the teeth of gears 418 (Figures 3 and 8) and 442, ring 414 must make 20 revolutions before the notches of ring 414, ratchet 410, and ratchet 446 are in alignment to permit the pawl 606 to enter its initial notch 416. As rotation takes place, the pawl 606 is prevented from falling by surfaces 628 and 632 (Figures 36 and 6) engaging the periphery of ratchets 410 and 446 respectively, and of course, the pawl will be prevented from falling until the notches are aligned.

Due to the setting, the handle 408 and also work spindle 54 will be arrested after the latter has traveled every seventh part of 360 degrees, and the number of arresting movements is indicated on the corresponding number wheel of the counter 432. After each arresting operation of handle 408 the lever 462 is rotated clockwise, as above described, and thereafter released whereby the device is conditioned for another seventh division or movement, the handle 408 being turned a suitable number of times until the pawl 606 again engages in its proper notch in ring 414.

As above pointed out, the left-hand dial 318 can never be zeroized, for with the arrangement of the device as shown, when dials 356 and 390 are zeroized and masked, the computation as shown by dial 318 through window 320 is from one to ten. When the numeral "10" is set in window 320, gear 284 (Figures 14 and 4) is in a position where it meshes with gear 230 (Figures 21 and 14) and 284 is the only selecting gear that can mesh with gear 230. The computation of the entire variator is according to the numeral indicated in window 320 multiplied by 100, i. e., if the numeral "7" is set in window 320, the computation is 700 in the entire variator. This multiplication by 100 is made possible by the arrangement of the ratchets 446, 414, and 410 and pawl 606.

It will thus be seen that if computation in 70 parts is desired instead of seven, it will only be necessary to move the selecting lever 486 so that button 488 is in engagement with notch 476. This will unmask window 358 but would retain window 392 masked and would render effective pawl 582 instead of pawl 606. The computation is still 700 in the entire variator and the multiplication by ten is made possible by the arrangements of ratchets 446, 414 and 410 and pawl 582. Again, if it were desired that the computation be 700 parts instead of 70 parts, button 488 would be moved to engage notch 478, rendering ineffective all pawls but pawl 540. When the device is set for 70, ratchets 446, 410 and 414 are effective. When it is set for 700 only ratchet 414 is effective. This arrangement permits the multiplication by tens.

It will be seen that the device is capable of being set up by means of the setting shafts 300, 302 and 304 for maximum indication of 1099 on the dials 318, 356 and 390. With this setting of the dials button 488 can be located either in notch 478 or 480 of top cover plate 424. When it is located in notch 478, the device will divide a circle on work spindle 54 into 1099 equal parts. When the lever 486 is moved to the position where button 488 engages in notch 480 all that is done is that it takes two movements of index lever 462 to move the work spindle 54 equivalent of 1/1099 of 360 degrees. It will thus be seen that it is possible to divide the circle carried by the work spindle 54 into 2198 equal parts.

There are really two types of dividing heads, those that divide a circle into equal number of divisions and those which are known as the astronomical type in which the divisions are degrees, minutes, seconds or multiples thereof. Since there are 360 degrees in a circles and 60 minutes in a degree, increments of ten minutes each can be obtained by setting up for 1080 on the dials and having button 488 in notch 480, giving 2160 equal divisions of a circle on work spindle 54. In this way the device converts the common dividing head automatically into an astronomical dividing head. It is true that most out and out astronomical dividing heads will go to a smaller increment than ten minutes of arc, but it happens that most machinist's hand-books give no data on circle division smaller than ten minutes of arc, and 2160 divisions will thus meet substantially all uses to which an astronomical head is put.

Previously the resetting of counter 432 to zero has been described, after the device has been "picked up." This reset counter has other uses than the mere fact that it can be zeroized at the start of a job. It sometimes happens that after indexing a set number of divisions, for example, even degrees, such as "30," it is desired to "jump" 90 degrees. This counter can be zeroized at any time, such as after the completion of "30," and the operator can run off the 90 degrees on the counter, picking up the register just ahead of the appearance of 90 on the counter. If this were not done, it would be necessary to make an addition of "90" to the "30" already shown, and this is sometimes undesirable because if any additions of this type are made they introduce the possibility of error. In this operation when the register is "picked up" at "90," the correct spacing was automatically caught. In other words, the operator merely jumped a number of spaces and started again in the same group of divisions with which he had originally started.

It is also possible by turning the operating handle 408 in a counter-clockwise direction as viewed in Figure 2 to turn the counter backwards any number of divisions desired. In indexing the operating handle 408 in this direction all of the ratchets are reversed and any one of pawls 540, 542, 582 and 606 that happen to be "functioning" at that particular time will allow this movement without any interference. When the handle is operated to again advance the device the proper pawls will again function to cause arresting operation at the proper increments chosen by the setting of the device. Thus increments may be repeated as desired. The ability to back the device up, as above described, is valuable in a number of ways. In running ahead, say, for example, 90 degrees the operator may over-shoot the mark and end up with 92 or 93. It is only necessary for him to turn the operating handle 408 in a counter-clockwise direction, backing up the counter to a position between 89 and 90 and then turning it clockwise until the register is "picked up." It will be noted that if it were necessary for the operator to hit exactly on the correct number, it would cause him to approach this position very slowly. This is an inherent fault of the present devices, for on these if the operator happens to lose the register, such as over-shooting the correct number or "getting off" on his count of turns of the handle and holes of the plate, the only thing that he can do is to go to the beginning and start over again, and again make every index up to the desired position.

Also, with present devices, it is impossible to back them up. In case it is necesary to go to a previous position of setting, the only recourse the operator has is to index ahead all around until he has caused the work spindle to move the full 360 degrees, then start indexing again and finally stop at the desired position. The need for doing this happens in cases where more than one machine operation is performed at each station and the operator discovers, after moving to some advance station, that he has missed an operation on a previous setting. It will be seen that with the herein disclosed indexer that all that is necessary is to back the device up until the counter itself shows the "number" at which the operation was missed.

At this place the operator can pick up the register, perform the operation, and can immediately proceed with the regular operations in the position at which he left off. Thus it will be seen that the counter itself, together with ability to back it up, zeroize it at will, and pick up any previous station on it, is a very valuable portion of the entire indexing device combination.

Again with a device embodying the herein included inventions it is possible to utilize it where it is desired to put holes of varying sizes and on various radii in a work piece. The various size holes can be drilled, punched or otherwise formed by changing tools, and the placement of the holes on varying radii can be handled by the use of radius bars in the machine, but some other device must be used for the varying angles and this can readily and quickly be done by the herein described indexer. This is simply done by setting up the indexer for the least common multiple of the varying number of the circle divisions. Thus with the radius bar, the various size hole forming tools and the indexer, the desired holes can be readily located and formed at the desired locations, the totalizer on the indexer giving the operator a visual indication or key to the location of each hole on each radius.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In a computing indexing device of the character described, the combination of a driving shaft, a gear train driven by said shaft, intermediate shafts driven by certain of the gears of said train at predetermined speeds, gears non-rotatably mounted on said intermediate shafts, selecting gears movable to selectively engage said last named gears, a driven shaft, differential means so connecting said selecting gears and said driven shaft that said shaft is given a movement which is a resultant of the combined movement of said selecting gears, setting means incuding a member for each selecting gear movable to move said selecting gears to selected positions, and locking means associated with each of the last named members of the setting means for maintaining the selecting gear associated with each of said last named members in selected position.

2. In a computing indexing device of the character described, the combination of a driving shaft, a gear train driven by said shaft, intermediate shafts driven by certain of the gears of said train at predetermined speeds, gears non-rotatably mounted on said intermediate shafts, selecting gears movable to selectively engage said last named gears, a driven shaft, differential means so connecting said selecting gears and said driven shaft that said shaft is given a movement which is a resultant of the combined movement of said selecting gears, setting means including a member for each selecting gear movable to move said selecting gears to selected position, interlock means associated with certain of said setting means and movable to a predetermined position, range means movable to predetermined positions with respect to the interlock means and so connected to said interlock means that the interlock means becomes effective to maintain the setting means in a predetermined position where it cannnot be set.

3. In a computing indexing device of the character described, the combination of a driving shaft, a gear train driven by said shaft, intermediate shafts driven by certain of the gears of said train at predetermined speeds, gears non-rotatably mounted on said intermediate shafts, selecting gears movable to selectively engage said last named gears, a driven shaft, differential means so connecting said selecting gears and said driven shaft that said shaft is given a movement which is a resultant of the combined movement of said selecting gears, setting means including a member for each selecting gear movable to move said selecting gears to selected position, interlock means associated with certain of said setting means and movable to a predetermined position, range means movable to predetermined positions with respect to the interlock means and so connected to said interlock means that the interlock means becomes effective to maintain the setting means in a predetermined position where it cannot be set, locking means associated with each of the last named members of the setting means for maintaining the selecting gear associated with each of said last named members in selected position.

4. In a computing indexing device of the character described, the combination of a driving shaft, a gear train driven by said shaft, intermediate shafts driven by certain of the gears of said train at predetermined speeds, gears non-rotatably mounted on said intermediate shafts, selecting gears movable to selectively engage said last named gears, a driven shaft, differential means so connecting said selecting gears and said driven shaft that said shaft is given a movement which is a resultant of the combined movement of said selecting gears, setting means including a member for each selecting gear movable to move said selecting gears to selected position, interlock means associated with certain of said setting means and movable to a predetermined position, range means movable to predetermined positions with respect to the interlock means and so connected to said interlock means that the interlock means becomes effective to maintain the setting means in a predetermined position where it cannot be set, said interlock means including a dial movable by the setting means to show the setting of said setting means, and a shutter associated with said certain setting means and movable by said range means to selectively mask the associated dial, and means between the dial and associated shutter movable to a position to lock the setting means while the shutter masks its associated dial.

5. In a computing indexing device of the character described, the combination of a driving shaft, a gear train driven by said shaft, intermediate shafts driven by certain of the gears of said train at predetermined speeds, gears non-rotatably mounted on said intermediate shafts, selecting gears movable to selectively engage said last named gears, a driven shaft, differential means so connecting said selecting gears and said driven shaft that said shaft is given a movement which is a resultant of the combined movement of said selecting gears, setting means including a member for each selecting gear movable to move said selecting gears to selected position, interlock means associated with certain of said setting means and movable to a predetermined position, range means movable to predetermined positions with respect to the interlock means and so connected to said interlock means that the interlock means becomes effective to maintain the setting means in a predetermined position where it cannot be set, said interlock means including a dial movable by the setting means to show the setting of said setting means, and a shutter associated with said certain setting means and movable by said range means to selectively mask the associated dial, and means between the dial and associated shutter movable to a position to lock the setting means while the shutter masks its associated dial, locking means associated with each of the last named members of the setting means for maintaining the selecting gear associated with each of said last named members in selected position.

6. In a computing indexing device, the combination of a drive shaft, a train of constantly meshed driving gears connected to said drive shaft, shafts rotatable with said driving gears, a plurality of sets of selecting gears fixedly mounted on said second named shafts, the driving gears in each set being constantly in mesh, a driven shaft, differential means connecting the selecting gears of each set to said driven shaft whereby the effective movements from the selected gear of each set is transmitted to said driven shaft, setting means for connecting the selected of said selecting gears in each set to the differential mechanism, said last named means including stop mechanism for arresting movement of said driven shaft after it has rotated a predetermined amount, and means operative when said last named means is in a predetermined position for preventing movement of the associated set of selecting gears.

7. In a computing indexing device, the combination of a drive shaft, a train of constantly meshed driving gears connected to said drive shaft, shafts rotatable with said driving gears, a plurality of sets of selecting gears fixedly mounted on said second named shafts, the driving gears in each set being constantly in mesh, a driven shaft, differential means connecting the selecting gears of each set to said driven shaft whereby the effective movements from the selected gear of each set is transmitted to said driven shaft, setting means for connecting the selected of said selecting gears in each set to the differential mechanism, said last named means including stop mechanism for arresting movement of said driven shaft after it has rotated a predetermined amount, range means for selectively adjusting the stop mechanism to change the range of the indexing device, and means operative when said last named means is in a predetermined position for preventing movement of the associated set of selecting gears.

8. In a computing indexing device, the combination of a drive shaft, a train of constantly meshed driving gears connected to said drive shaft, shafts rotatable with said driving gears, a plurality of sets of selecting gears fixedly mounted on said second named shafts, the driving gears in each set being constantly in mesh, a driven shaft, differential means connecting the selecting gears of each set to said driven shaft whereby the effective movements from the selected gear of each set is transmitted to said driven shaft, setting means for connecting the selected of said selecting gears in each set to the differential mechanism, said last named means including stop mechanism for arresting movement of said driven shaft after it has rotated a predetermined amount, range means for selectively adjusting the stop mechanism to change the range of the indexing device, means operative when said last named means is in a predetermined position for preventing movement of the associated set of selecting gears, and a resettable counter driven from said differential means for counting the number of times the driven shaft is arrested.

9. In a computing indexing device, the combination of a drive shaft, a train of constantly meshed driving gears connected to said drive shaft, shafts rotatable with said driving gears, a plurality of sets of selecting gears fixedly mounted on said second named shafts, the driving gears in each set being constantly in mesh, a driven shaft, differential means connecting the selecting gears of each set to said driven shaft whereby the effective movements from the selected gear of each set is transmitted to said driven shaft, setting means for connecting the selected of said selecting gears in each set to the differential mechanism, said last named means including stop mechanism for arresting movement of said driven shaft after it has rotated a predetermined amount, range means for selectively adjusting the stop mechanism to change the range of the indexing device, means operative when said last named means is in a predetermined position for preventing movement of the associated set of selecting gears, and a resettable counter driven from said differential means for counting the number of times the driven shaft is arrested, said counter having a work take off shaft rotated in accordance with the driving means for the counter.

10. In a computing indexing device, the combination of a drive shaft, a train of constantly meshed driving gears connected to said drive shaft, shafts rotatable with said driving gears, a plurality of sets of selecting gears fixedly mounted on said second named shafts, the driving gears in each set being constantly in mesh, a driven shaft, differential means connecting the selecting gears of each set to said driven shaft whereby the effective movements from the selected gear of each set is transmitted to said driven shaft, setting means for connecting the selected of said selecting gears in each set to the differential mechanism, said last named means including stop mechanism for arresting movement of said driven shaft after it has rotated a predetermined amount, range means for selectively adjusting the stop mechanism to change the range of the indexing device, means operative when said last named means is in a predetermined position for preventing movement of the associated set of selecting gears, a resettable counter driven from said differential means for counting the number of times the driven shaft is arrested, setting means for each of the setting means including shafts, interlock means associated with certain of said setting means and each movable to a predetermined position, said range means being movable to predetermined positions with respect to the interlock means whereby the interlock means each become effective to maintain the setting means in a predetermined position where it cannot be set, said interlock means including a dial movable by the setting means to show the setting of said setting means, and a shutter associated with said certain setting means and movable by said range means to selectively mask the associated dial, and means between the dial and associated shutter movable to a position to lock the setting means while the shutter masks its associated dial.

11. In a computing indexing device of the character described, the combination of a driving shaft, a gear train driven by said shaft, intermediate shafts driven by certain of the gears of said train at predetermined speeds, gears nonrotatably mounted on said intermediate shafts, selecting gears movable to selectively engage said last named gears, a driven shaft, differential means so connecting said selecting gears and said driven shaft that said shaft is given a movement which is a resultant of the combined movement of said selecting gears, setting means including a member for each selecting gear movable to move said selecting gears to selected position, interlock means associated with certain of said setting means and movable to a predetermined position, range means movable to predetermined positions with respect to the interlock means and so connected to said interlock means that the interlock means becomes effective to maintain the setting means in a predetermined position where it cannot be set, said interlock means including a dial movable by the setting means to show the setting of said setting means, and a shutter associated with said certain setting means and movable by said range means to selectively mask the associated dial, and means between the dial and associated shutter movable to a position to lock the setting means while the shutter masks its associated dial, said last named means including means for preventing the shutter from moving to masking position until the associated dial which it is to mask is in a predetermined position.

12. In a computing indexing device of the character described, the combination of a driving shaft, a gear train driven by said shaft, intermediate shafts driven by certain of the gears of said train at predetermined speeds, gears nonrotatably mounted on said intermediate shafts, selecting gears movable to selectively engage said last named gears, a driven shaft, differential means so connecting said selecting gears and said driven shaft that said shaft is given a movement which is a resultant of the combined movement of said selecting gears, setting means including a member for each selecting gear movable to move said selecting gears to selected position, interlock means associated with certain of said setting means and movable to a predetermined position, range means movable to predetermined positions with respect to the interlock means and so connected to said interlock means that the interlock means becomes effective to maintain the setting means in a predetermined position where it cannot be set, said interlock means including a dial movable by the setting means to show the setting of said setting means, and a shutter associated with said certain setting means and movable by said range means to selectively mask the associated dial, and means between the dial and associated shutter movable to a position to lock the setting means while the shutter masks its associated dial, said last named means including means for preventing the shutter from moving to masking position until the associated dial which it is to mask is in a predetermined position, and means preventing the movement of a masked dial.

SHERWOOD HINDS.

REFERENCES CITED

The following references are of record in the file of this patent:

UNITED STATES PATENTS

| Number | Name | Date |
| --- | --- | --- |
| 1,610,882 | Reynolds | Dec. 14, 1926 |
| 1,699,841 | Grout | Jan. 22, 1929 |
| 2,111,996 | Slye | Mar. 22, 1938 |
| 2,285,414 | Collins | June 9, 1942 |
| 2,411,617 | Elliott | Nov. 26, 1946 |
| 2,472,478 | Hinds | June 7, 1949 |

FOREIGN PATENTS

| Number | Country | Date |
| --- | --- | --- |
| 358,421 | France | Dec. 18, 1905 |